United States Patent
Agrawal et al.

(10) Patent No.: US 12,167,120 B2
(45) Date of Patent: *Dec. 10, 2024

(54) ELECTRONIC DEVICE WITH AUTOMATIC EYE GAZE TRACKING AND CAMERA ADJUSTMENT

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,545

(22) Filed: Dec. 12, 2023

(65) Prior Publication Data

US 2024/0114229 A1    Apr. 4, 2024

Related U.S. Application Data

(63) Continuation of application No. 17/682,388, filed on Feb. 28, 2022, now Pat. No. 11,889,178.

(51) Int. Cl.
*H04N 23/611* (2023.01)
*G06F 3/16* (2006.01)
*H04N 5/60* (2006.01)

(52) U.S. Cl.
CPC ............. *H04N 23/611* (2023.01); *G06F 3/16* (2013.01); *H04N 5/607* (2013.01)

(58) Field of Classification Search
CPC ...... H04N 5/607; H04N 23/611; H04N 23/62; H04N 23/64; H04N 23/61; H04N 23/667; H04N 23/69; H04N 23/60; G06F 3/16
USPC ........................................................ 348/211.6
See application file for complete search history.

(56) References Cited

U.S. PATENT DOCUMENTS

| | | | | |
|---|---|---|---|---|
| 7,860,382 B2 * | 12/2010 | Grip | .................. | G02B 7/287 348/333.03 |
| 9,628,699 B2 * | 4/2017 | Cheng | .................. | H04N 23/62 |
| 9,661,215 B2 | 5/2017 | Sivan | | |
| 9,961,215 B2 * | 5/2018 | Sakai | .................. | G06F 3/1292 |
| 11,410,331 B2 * | 8/2022 | Kassis | .................. | G06T 19/006 |
| 11,561,587 B2 * | 1/2023 | Schenone | .................. | H04N 23/53 |
| 11,677,899 B2 * | 6/2023 | Vanka | .................. | G06F 3/017 348/705 |

(Continued)

*Primary Examiner* — Pritham D Prabhakher
(74) *Attorney, Agent, or Firm* — Isidore PLLC

(57) ABSTRACT

A method provides camera adjustments based on eye gaze tracking and non-video contextual input. The method includes capturing, via a front facing camera, a face of a user and determining an eye gaze direction of the user based on a first image in a first image stream. The method includes receiving non-video input, determining, from the non-video input, one or more contexts related to a focus of the first user, and selecting a camera, at least partially based on the eye gaze direction and the one or more contexts. The method includes: generating at least one camera setting of a selected camera at least partially based on the first location and the context(s) determined from the non-video input; and activating the selected camera as an active camera, with the at least one camera setting, to capture a field of view that includes the focus of the first user.

20 Claims, 17 Drawing Sheets

(56) References Cited

U.S. PATENT DOCUMENTS

| | | | |
|---|---|---|---|
| 2008/0080846 A1* | 4/2008 | Grip | H04M 1/0264 |
| | | | 348/E5.045 |
| 2016/0156838 A1* | 6/2016 | Cheng | H04N 23/90 |
| | | | 348/222.1 |
| 2016/0261793 A1* | 9/2016 | Sivan | G06F 3/013 |
| 2017/0184846 A1* | 6/2017 | Lu | G02B 27/017 |
| 2017/0364148 A1* | 12/2017 | Kim | G06F 3/04842 |
| 2020/0357184 A1* | 11/2020 | Paul | G06F 3/04886 |
| 2021/0096611 A1* | 4/2021 | Schenone | H04N 21/4316 |
| 2021/0104063 A1* | 4/2021 | Kassis | G06F 3/0304 |
| 2021/0158049 A1* | 5/2021 | Leppänen | G06V 10/764 |
| 2022/0311951 A1 | 9/2022 | Mounika et al. | |
| 2022/0311952 A1* | 9/2022 | Vanka | G06F 3/017 |
| 2023/0213729 A1* | 7/2023 | Huang | G02B 7/08 |
| | | | 359/823 |

* cited by examiner

| Eye Gaze Direction 260 | Context Identifying Data 254 | | Front ICD 132A | Rear ICD(s) 133 | | |
|---|---|---|---|---|---|---|
| | Context Identifier 510 | Context Type 520 | | Main 133A | Wide 133B | Tele 133C |
| Rear | Self-Image | Speaker | X | | | |
| Rear | Location | Store | | X | | |
| Front | Object | Far Object | X | | | X |
| Rear | Object | Near Object | | X | | |
| Rear | Outdoors | Mountains | | | X | |
| Front | Outdoors | Mountains | X | | | |

Context Table 252

ELECTRONIC DEVICE WITH AUTOMATIC EYE GAZE TRACKING AND CAMERA ADJUSTMENT

PRIORITY APPLICATION

This application is a continuation of U.S. patent application Ser. No. 17/682,388, filed Feb. 28, 2022, the content of which is incorporated herein by reference.

BACKGROUND

1. Technical Field

The present disclosure generally relates to electronic devices with front and rear cameras and in particular to automatic camera selection in an electronic device with front and rear cameras.

2. Description of the Related Art

Communication devices, such as cell phones, tablets, and laptops, are widely used for communication and data transmission. These communication devices support various communication modes/applications, such as text messaging, audio calling and video calling. Communication devices typically include one or more cameras that are used for taking pictures and videos and for supporting video calling or image content streaming. Many conventional communication devices have at least one front facing camera and one or more rear facing cameras. With communication devices that have multiple rear facing cameras, the rear facing cameras can have lenses that are optimized for various focal angles and distances. For example, one rear facing camera can have a wide angle lens, another rear facing camera can have a telephoto lens, and an additional rear facing camera can have a macro lens. A communication device user has to manually switch the camera to be used between the front facing camera and the rear facing cameras depending upon the picture/video that the communication device user desires to be taken/shared. Often a default camera is not the correct camera and the user has to manually select the correct camera to be used.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
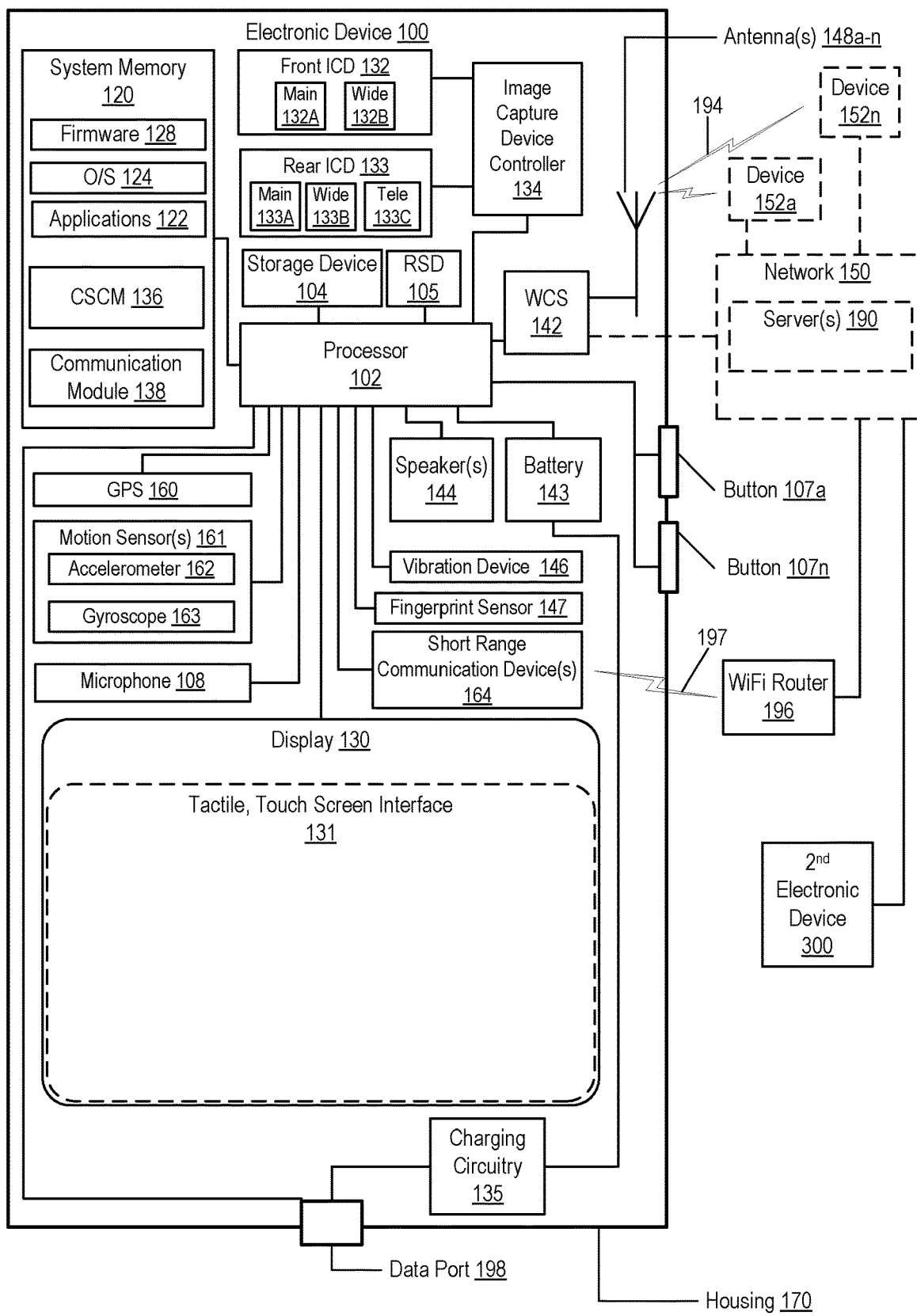
FIG. 1A depicts an example electronic device within which various aspects of the disclosure can be implemented, according to one or more embodiments.

According to one aspect of the disclosure, the illustrative embodiments provide an electronic device, a method, and a computer program product for selecting an active camera from among at least one front facing camera and at least one rear facing camera for use by the electronic device, in part based on a gaze direction of a user of the device. In a first embodiment, an electronic device includes a front surface and a rear surface, at least one front facing camera, at least one rear facing camera, and a memory having stored thereon a camera selection and control module (CSCM) for selecting an active camera from among the at least one front facing camera and the at least one rear facing camera for use by the electronic device. The electronic device further includes at least one processor that is communicatively coupled to each of the at least one front facing camera, each of the at least one rear facing camera, and to the memory. The at least one processor executes program code of the CSCM, which enables the electronic device to capture, via the at least one front facing camera, a first image stream containing a face of a first user. A first eye gaze direction of the first user is determined based on a first image retrieved from the first image stream. The first eye gaze direction corresponds to a first location where the first user is looking. In response to determining that the first user is looking away from the front surface of the electronic device and towards a direction within a field of view (FOV) of the at least one rear facing camera, the processor selects an active camera that corresponds to one of the at least one rear facing cameras with a FOV containing the first location to which the first user is looking.

According to another embodiment, the method includes capturing, via at least one front facing camera, a first image stream containing a face of a first user and determining, via at least one processor, a first eye gaze direction of the first user based on a first image retrieved from the first image stream. The first eye gaze direction corresponds to a first location where the first user is looking. The method further includes, in response to determining that the first user is looking away from a front surface of an electronic device and towards a direction within a field of view (FOV) of the at least one rear facing camera, selecting, as an active camera, a corresponding one of at least one rear facing camera with a FOV containing the first location to which the first user is looking.

According to another aspect of the disclosure, the illustrative embodiments provide an electronic device, a method, and a computer program product for automatic camera adjustments based on eye gaze tracking. In a first embodiment, an electronic device includes a front surface with at least one front facing camera, a rear surface with at least one rear facing camera, and a memory having stored thereon a camera selection and control module (CSCM) for controlling the at least one front facing camera and the at least one rear facing camera. The electronic device further includes at least one processor communicatively coupled to each of the at least one front facing camera, each of the at least one rear facing camera, and to the memory. The at least one processor executes program code of the CSCM, which enables the electronic device to capture, via the at least one front facing camera, a first image stream containing a face of a first user and to determine a first eye gaze direction of the first user based on a first image retrieved from the first image stream. The first eye gaze direction corresponds to a first location where the first user is looking. In response to determining that the first user is looking away from the front surface of the electronic device and towards a direction within a field of view (FOV) of the at least one rear facing camera, the processor identifies image characteristics of the first location and generates at least one camera setting for a selected one of the at least one rear facing camera at least partially based on the first eye gaze direction and identified characteristics of the first location. The processor adjusts the selected rear facing camera using the generated at least one camera setting such that the selected rear facing camera focuses on the first location, and the processor activates the selected rear facing camera as an active camera.

According to another embodiment, the method includes capturing, via at least one front facing camera, a first image stream containing a face of a first user and determining a first eye gaze direction of the first user based on a first image retrieved from the first image stream. The first eye gaze direction corresponds to a first location where the first user is looking. In response to determining that the first user is looking away from the front surface of the electronic device and towards a direction within a field of view (FOV) of the at least one rear facing camera, the method further includes identifying image characteristics of the first location and generating at least one camera setting for a selected one of the at least one rear facing camera at least partially based on the first eye gaze direction and identified characteristics of the first location. The method further includes adjusting the selected rear facing camera using the generated at least one camera setting such that the selected rear facing camera focuses on the first location, and the method includes activating the selected rear facing camera as an active camera.

According to an additional embodiment, a computer program product includes a computer readable storage device having stored thereon program code that, when executed by at least one processor of an electronic device having a front surface, a rear surface, at least one front facing camera, at least one rear facing camera, enables the electronic device to complete the functionality of one or more of the above described methods.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. It is appreciated that electronic device 100 can be other types of devices that include both at least one front facing camera and at least one rear facing camera and which supports both video and non-video communication with one or more second electronic devices. Electronic device 100 includes processor 102, which is communicatively coupled to storage device 104, system memory 120, input devices, introduced below, output devices, such as display 130, and image capture device (ICD) controller 134. Processor 102 can include processor resources such as a central processing unit (CPU) that support computing, classifying, processing and transmitting of data and information. According to one or more embodiments, ICD controller 134 performs or supports functions such as, but not limited to, selecting and activating an active camera from among multiple cameras, adjusting the camera settings and characteristics (shutter speed, f/stop, ISO exposure, zoom control, etc.) of the active camera, etc. ICD controller 134 can perform these functions in response to commands received from processor 102, which is executing camera selection and control module (CSCM) 136. In one or more embodiments, the functionality of ICD controller 134 is incorporated within processor 102, eliminating the need for a separate ICD controller. For simplicity in describing the features presented herein, the various camera selection, activation, and configuration functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, camera selection and control module (CSCM) 136, and communication module 138. CSCM 136 includes program code that is executed by processor 102 to enable electronic device 100 to select an active camera from among at least one front facing camera and at least one rear facing camera for use by the electronic device. Communication module 138 includes program code that is executed by processor 102 to enable electronic device 100 to communicate with other external devices and systems.

Although depicted as being separate from applications 122, CSCM 136 and communication module 138 may be each implemented as an application. Processor 102 loads and executes program code stored in system memory 120. Examples of program code that may be loaded and executed by processor 102 include program code associated with applications 122 and program code associated with CSCM 136 and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of CSCM 136 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear facing cameras 132, 133. Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Electronic device 100 includes several front facing cameras 132. First front facing camera 132A is a main camera that captures a standard angle FOV. Second front facing camera 132B is wide angle camera that captures a wide angle FOV. Front facing cameras 132A and 132B can be collectively referred to as front facing cameras 132A-132B. While two front facing cameras 132A-132B are shown, electronic device 100 can have more or less than two front facing cameras.

Electronic device 100 further includes several rear facing cameras 133. First rear facing camera 133A is a main camera that captures a standard angle FOV. Second rear facing camera 133B is wide angle camera that captures a wide angle FOV. Third rear facing camera 133C is a telephoto ICD that captures a telephoto FOV (zoom or magnified). Each rear facing camera 133A, 133B and 133C is communicatively coupled to ICD controller 134, which is communicatively coupled to processor 102. ICD controller 134 supports the processing of signals from rear facing cameras 133A, 133B and 133C. Rear facing cameras 133A, 133B and 133C can be collectively referred to as rear facing cameras 133A-133C. While three rear facing cameras are shown, electronic device 100 can have less than three rear facing cameras, such as having only one or two rear facing cameras or can have more than three rear facing cameras.

Electronic device 100 can further include data port 198, charging circuitry 135, and battery 143. Electronic device 100 further includes microphone 108, one or more output devices such as speakers 144, and one or more input buttons 107a-n. Input buttons 107a-n may provide controls for volume, power, and image capture device 132. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-n allow electronic device 100 to communicate wirelessly with wireless network 150 via transmissions of communication signals 194 to and from network communication devices 152a-n, such as base stations or cellular nodes, of wireless network 150. In one embodiment, communication network devices 152a-n contain electronic communication equipment to allow communication with electronic device 100. Wireless network 150 further allows electronic device to wirelessly communicate with second electronic devices 300, which can be similarly connected to wireless network 150 via one of network communication devices 152a-n Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. In one or more embodiment, wireless network 150 can include one or more servers 190 that support exchange of wireless data and video and other communication between electronic device 100 and second electronic device 300.

Electronic device 100 further includes short range communication device(s) 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, electronic device 100 can receive internet or Wi-Fi based calls via short range communication device 164. In one embodiment, electronic device 100 can communicate with WiFi router 196 wirelessly via short range communication device 164. In an embodiment, WCS 142, antennas 148a-n and short-range communication device(s) 164 collectively provide communication interface(s) of electronic device 100. These communication interfaces enable electronic device 100 to communicatively connect to at least one second electronic device 300 via at least one network.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites. In one embodiment, the time data and location data can be utilized by processor 102 in determining a current context of a communication.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. In one or more embodiments, the measurements of these various sensors can also be utilized by processor 102 in the determining of the context of a communication. Electronic device 100 further includes a housing 170 that contains/protects the components of the electronic device.

In the description of each of the following figures, reference is also made to specific components illustrated within the preceding figure(s). Similar components are presented with the same reference number and some components may be provided with a subscripted reference number (e.g., 100a, 100b) to represent a same component/device being shown in a different context/configuration.

Figure 1C:
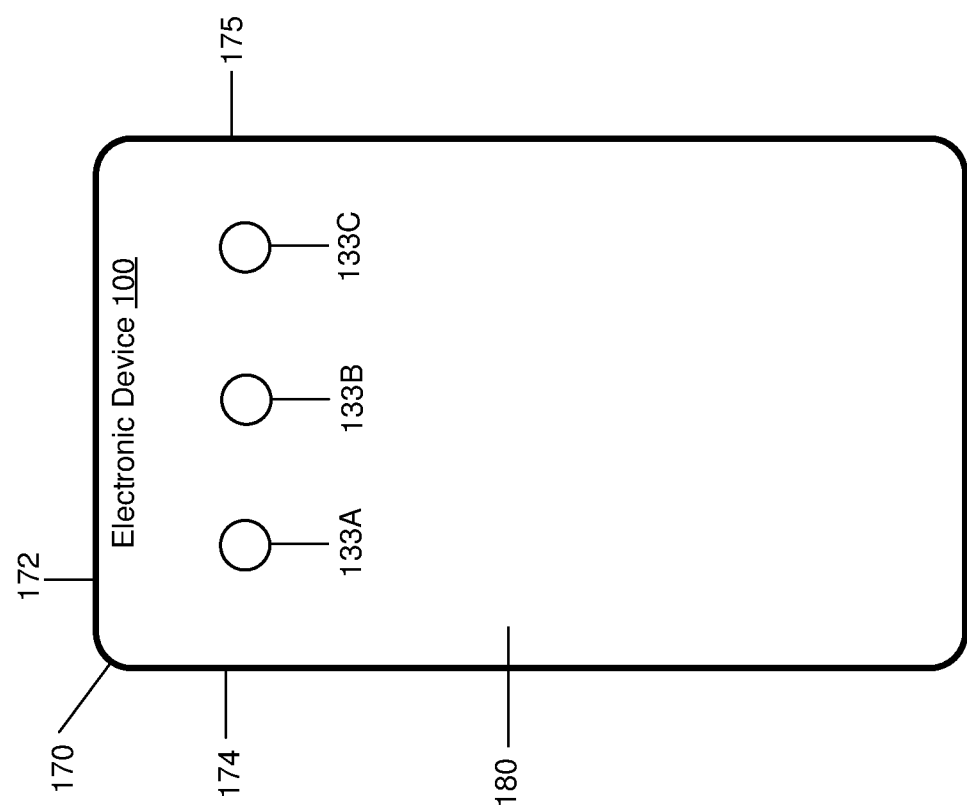
FIG. 1C is an example illustration of the rear of an electronic device with multiple rear facing cameras, according to one or more embodiments.
Figure 1B:
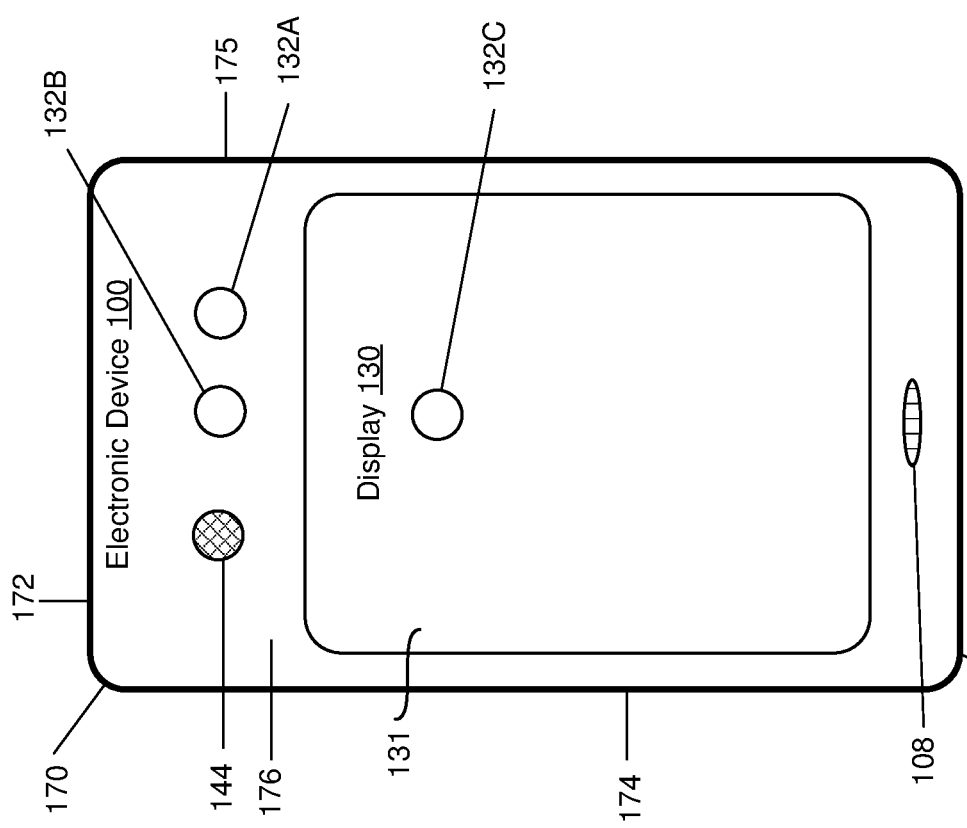
FIG. 1B is an example illustration of the front of an electronic device with front facing cameras, according to one or more embodiments.

Turning to FIG. 1B, additional details of the front surface of electronic device 100 are shown. Electronic device 100 includes a housing 170 that contains the components of electronic device 100. Housing 170 includes a top 172, bottom 173, and opposed sides 174 and 175. Housing 170 further includes a front surface 176. Various components of electronic device 100 are located on front surface 176. Microphone 108, display 130, front facing cameras 132A, 132B, 132C, and speaker 144 are located on/at front surface 176. In the illustrative embodiment, front facing camera 132C is a camera under display or CUD.

With additional reference to FIG. 1C, additional details of the rear surface of electronic device 100 are shown. Housing 170 further includes a rear surface 180. Various components of electronic device 100 are located on/at rear surface 180, including rear facing cameras 133. Rear facing main FOV camera 133A, rear facing wide angle FOV camera 133B, and rear facing telephoto angle FOV camera 133C are illustrated located on rear surface 180. Each of the multiple rear facing cameras can have different image capturing characteristics. For example, rear facing telephoto angle FOV camera 133C can include an optical zoom lens that is optimized for capturing images of distant objects.

Figure 2:
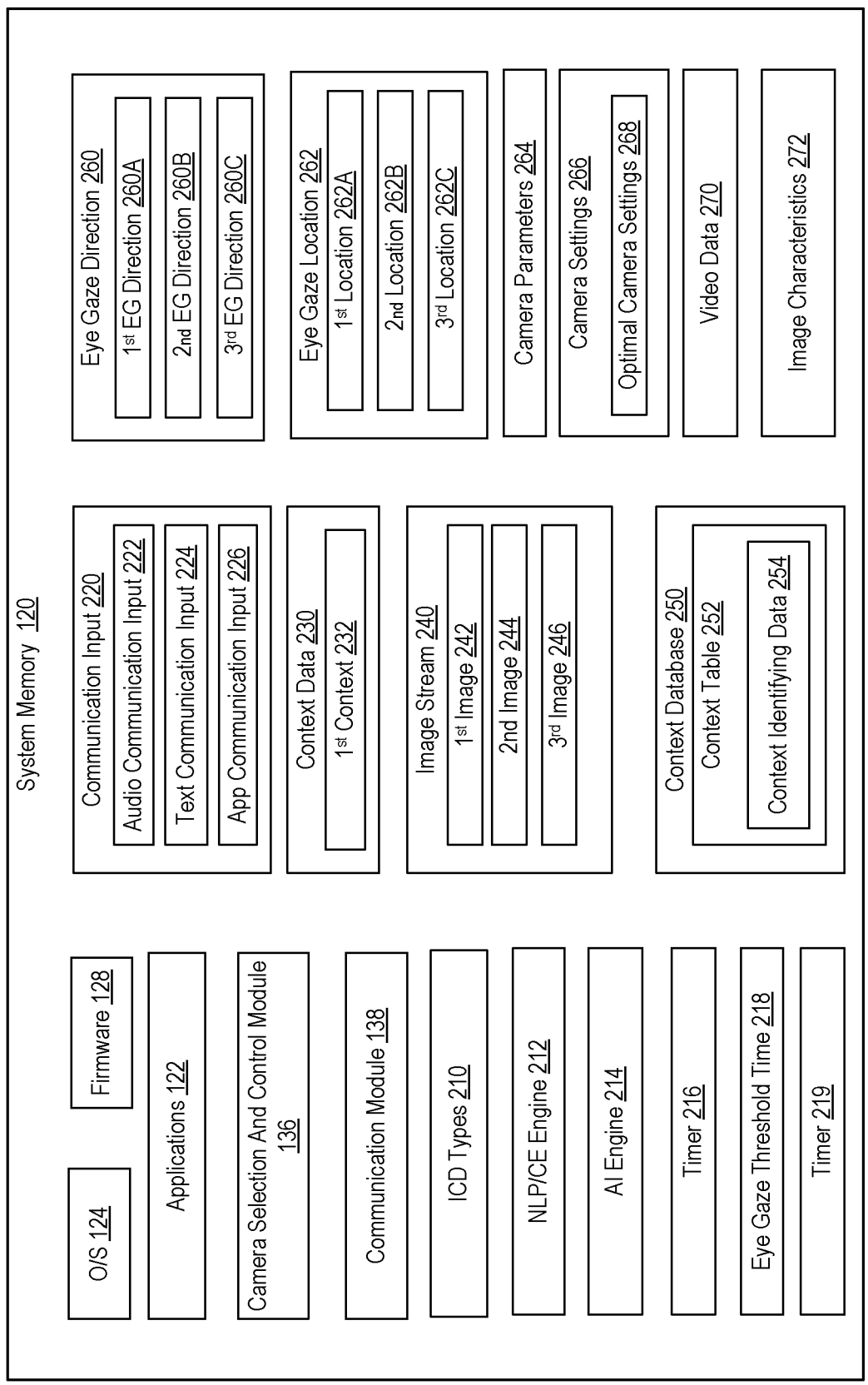
FIG. 2 is a block diagram of example contents of the system memory of the example electronic device of FIG. 1A, according to one or more embodiments.

Referring to FIG. 2, there is shown one embodiment of example contents of system memory 120 of electronic device 100. System memory 120 includes data, software, and/or firmware modules, including applications 122, operating system 124, firmware 128, CSCM 136, and communication module 138.

CSCM 136 includes program code that is executed by processor 102 to enable electronic device 100 to perform the various features of the present disclosure. In one or more embodiments, CSCM 136 enables electronic device 100 to determine an eye gaze direction corresponding to a first location where a first user is looking and to select an active camera from at least one rear facing camera 133 for use by the electronic device. The active camera corresponds to a rear facing camera with a field of view (FOV) containing the first location to which the first user is looking. In one or more embodiments, execution of CSCM 136 by processor 102 enables/configures electronic device 100 to perform the processes presented in the flowcharts of FIGS. 9 (9A-9B), 10, 11 (11A-11B), and 12 as will be described below.

Communication module 138 enables electronic device 100 to communicate with wireless network 150 and with other devices, such as second electronic device 300, via one or more of audio, text, and video communications. Communication module 138 supports various communication sessions by electronic device 100, such as audio communication sessions, video communication sessions, text communication sessions, communication device application communication sessions, or a dual/combined audio/text/video communication session.

System memory 120 further includes ICD or camera types 210, natural language processing/context evaluation (NLP/CE) engine 212, artificial intelligence (AI) engine 214, timer 216, eye gaze threshold time 218 and timer 219. Camera types 210 contains information identifying the specific front and rear facing cameras 132A, 132B, 133A, 133B and 133C that are included in electronic device 100 and/or settings/characteristics of each camera. NLP/CE engine 212 enables electronic device 100 to transcribe an audio stream from audio input or an audio communication session into words, in a text format, and to determine the context of the audio input/communication session. NLP/CE engine 212 can also receive text input from a text communication session. NLP/CE engine 212 further enables electronic device 100 to determine what a body of text really means by comparing the text to known database of information, such as context database 250. Further details of NLP/CE engine 212 will be described with reference to FIG. 4. AI engine 214 enables electronic device 100 to generate at least one camera setting for the active camera (i.e., one of cameras 132, 133) based at least partially on a current eye gaze direction of a user of electronic device 100. Timer 216 can track the amount of time that a user's eye gaze has rested/remained on a specific area. Eye gaze threshold time 218 is a preset minimum amount of time that a user's eye gaze has remained on the same specific area (i.e., within a small deviation in general direction). Eye gaze threshold time 218 is a minimum amount of time that a user is looking away from front surface 176 and display 130 before the controller will initiate/trigger a switch from front facing camera to one of the rear facing cameras. Timer 219 tracks a time period for a user to select a camera activation icon.

System memory 120 further includes communication input 220, context data 230, context database 250, video data 270, and identified image characteristics 272. Communication input 220 can be non-video communication input. As shown, communication input 220 includes audio communication input 222, text communication input 224, and application communication input 226. Audio communication input 222 is audio received via microphone 108. Text communication input 224 is text received via an input device such as tactile, touch screen interface 131, or keyboard (not shown). Application communication input 226 can be either audio or text input depending on the application 122 being used by electronic device 100. Context data 230 is generated by NLP/CE engine 212 based on communication input 220. Illustrated examples of context data 230 incudes first context 232. First context 232 corresponds to a specific content received within communication input. For example, first context 232 can be generated by NLP/CE engine 212 based on audio communication input 222. In one embodiment, NLP/CE engine 212 can identify keywords and phrases in audio communication input 222. The audio communication input 222 can contains words and phrases having specific meaning and related to specific circumstances that are associated with the first context 232. The keywords and phrases are then used to identify one or more contexts. In one embodiment, the context data (i.e., first context 232) can include several context types that are subsets of the first context. According to one aspect, these context types and subsets thereof present information that can be utilized, along with the user's current eye-gaze direction, to identify which one of the multiple cameras to select and activate for image/video capturing.

Context database 250 includes one or more context tables 252. Context table 252 contains a set of pre-determined context identifiers and context types that are associated with specific words and phrases received from NLP/CE engine. These words and phrases refer to (or are correlate to) pre-identified contexts that are mapped within context tables. For example, the word/phrase "my haircut" can be a keyword/key-phrase that is correlated within the context database to a context table referring to a self-image of the speaker. The context table can then be further aligned or linked to one or more of cameras 132A, 132B, 133A, 133B and 133C. Context data 230, which is generated by NLP/CE 212 based on communication input 220, is mapped/parsed to one or more entries within context table 252 to select the context identifiers and context types from the one or more entries within context table 252. The selection is based on additional details provided by communication input 220 and additional contextual cues. Context identifying data 254 includes context identifiers and context types that result from the mapping/parsing of context table 252 with context data 230. Further details of context table 252 will be described with reference to FIG. 5.

System memory 120 further includes image stream 240, eye gaze direction 260 and eye gaze location 262. Image stream 240 is a stream of images (e.g., multiple still photographs or a continuous video) captured by at least one of front facing cameras 132A-132B. Example image stream 240 includes one or more images such as first image 242, second image 244, and third image 246. In one embodiment, image stream 240 can contain the face of a user of electronic device 100.

Eye gaze direction 260 is the direction that a user of electronic device 100 is looking relative to electronic device 100. Eye gaze direction 260 can include a plurality of discrete directions, such as first eye gaze direction 260A, second eye gaze direction 260B, and third eye gaze direction 260C. In one embodiment, eye gaze direction 260 can be defined as an angular value from the planar front surface 176 or rear surface 180 of electronic device 100. In this example 0 degrees can be defined as a straight ahead direction that is perpendicular to front surface 176 and rear surface 180. A user looking to the right can have a horizontal eye gaze direction 260 that is a positive angular value (e.g., +15 degrees) and a user looking to the left can have a horizontal eye gaze direction 260 that is a negative angular value (e.g., −15 degrees) relative to the horizontal plane. A user with eye gaze directed upwards can have a positive vertical eye gaze direction (e.g., +10 degrees) and a user with eye gaze directed downwards (e.g., towards the floor behind the electronic device) can have a negative vertical eye gaze direction (e.g., −30 degrees).

Eye gaze location 262 is a specific location that a user of electronic device 100 is looking, which correlates to and is determined based on the eye gaze direction 260. Eye gaze location 262 can include a plurality of discrete locations, such as first location 262A, second location 262B, and third location 262C. According to one embodiment, eye gaze location 262 can include the distance and vertical orientation to the location where the user is looking based on the corresponding eye gaze direction. For example, eye gaze location 262 can have a distance 20 feet from electronic device 100, a vertical orientation of 5 degrees upwards, and a horizontal direction that is positive (right) 15 degrees from the rear surface 180 of electronic device 100. It is appreciated that the dimensions and orientations measurements would be based on the back surface of electronic device 100 representing a vertical/Y plane, in a 3-dimensional X-Y-Z axes coordinate plane extending through a center point of the back surface of electronic device 100.

System memory 120 further includes camera parameters 264 and camera settings 266. Camera parameters 264 are values that are associated with cameras 132A-132B and 133A-133C. Camera parameters 264 are at least partially used in determining camera settings 266 for cameras 132A-132B and 133A-133C. Camera parameters 264 can include fixed values such as focal length, maximum frame rate, resolution and variable values such as light level values, directional values and distances to objects within a camera field of view (FOV).

Camera settings 266 are values and characteristics that can change during the operation of cameras 132A-132B and 133A-133C to capture images by the cameras. In one embodiment, camera settings 266 can be determined by either processor 102 or by ICD controller 134. Camera settings 266 can include various settings such as aperture, shutter speed, iso level, white balance, zoom level, directional settings (i.e., region of interest (ROI)), distance settings, focus and others. Camera settings 266 can include optimal camera settings 268 that are selected to optimize the quality of the images captured by the cameras. Optimal camera settings 268 can include zoom levels, focus distance, and directional settings that allow images within a camera FOV and that are desired to be captured to be in focus, centered, and correctly sized. Optimal camera settings 268 can further include digital crop levels, focal distance of the focus module and directional audio zoom. The directional audio zoom enables microphone 108 to be tuned to receive audio primarily in the direction of a cropped FOV in a desired ROI. Optimal camera settings 268 can further include modified electronic image stabilization (EIS) that enables stabilization to be optimized for subjects in a cropped FOV and exposure compensation that enables the cropped FOV to not be under or over exposed in a camera preview (viewfinder).

System memory 120 further includes video data 270 and image characteristics 272. Video data 270 is image content or video information that is recorded or captured by cameras 132A-132B and 133A-133C. In one embodiment, video data 270 can be exchanged between electronic device 100 and second electronic device 300. Image characteristics 272 are attributes identified as associated with an eye gaze location 262 and are used to adjust one or more camera settings to focus the camera on the eye gaze location. For example, image characteristics 272 can include light levels at the eye gaze location, face detection at the eye gaze location and scene detection at the eye gaze location. Image characteristics 272 can further include contrast detection autofocus that achieves focus on a subject based on the contrast change of the edges in the eye gaze location. Alternatively, image characteristics 272 can include phase detection autofocus that enables focusing on a subject based on the convergence of two separate beams of light. Image characteristics 272 can further include computer vision (CV), machine learning (ML) and artificial intelligence (AI) based techniques for determining an object of interest within the eye gaze area ROI.

Figure 3:
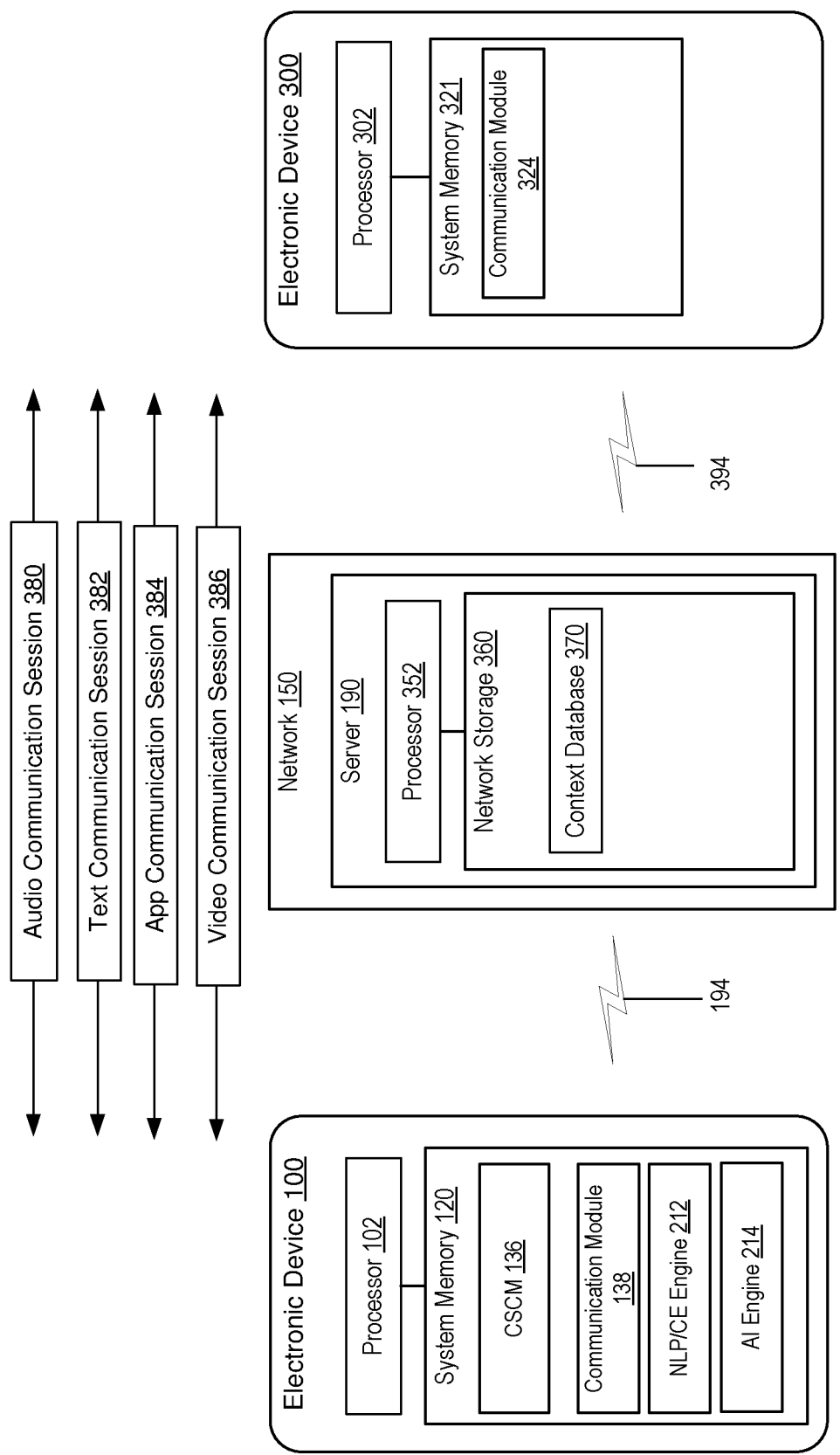
FIG. 3 is an example illustration of a two electronic devices in communication via a wireless network, according to one or more embodiments.

FIG. 3 illustrates electronic device 100 in communication with second electronic device 300 via wireless network 150. Electronic device 100 communicates wirelessly with wireless network 150 via one or more communication signals 194 and second electronic device 300 communicates wirelessly with wireless network 150 via one or more communication signals 394.

Second electronic device 300 includes one or more processors 302 and system memory 320. System memory 321 may be a combination of volatile and non-volatile memory, such as random access memory (RAM) and read-only memory (ROM). System memory 321 can store program code and data associated with communication module 324. Communication module 324 includes program code that is executed by processor 302 to enable electronic device 300 to communicate with other external devices and systems, such as electronic device 100.

Wireless network 150 includes server 190. Server 190 includes one or more processors 352 and network storage 360. Network storage 360 can include storage devices such as system memory, hard drives and solid state drives. Network storage 360 can store a context database 370. Electronic device 100 and electronic device 300 can each communicate with each other, via wireless network 150, using one or more of several communication sessions. Electronic device 100 and electronic device 300 can communicate with each other using an audio communication session 380, a text communication session 382, an application communication session 384, and a video communication session 386, or a combination session.

In an embodiment, electronic device 100 can receive communication input 220 via an input device such as microphone 108. Microphone 108 can receive audio communication input 222. Processor 102, executing NLP/CE engine 212 can determine a first context 232 based on the audio communication input 222 and context database 250 (FIG. 2). The first context 232 can then be linked within context tables to select a specific active camera, at least partially based on first context 232 to capture and share video data. The selected active camera is one of front or rear cameras 132A-132B and 133A-133C.

In another embodiment, electronic device 100 can receive communication input 220 associated with a non-video communication session (i.e., audio communication session 380 between electronic device 100 and electronic device 300. Processor 102, executing NLP/CE engine 212 can determine a first context 232 based on the audio communication and context database 250 (FIG. 2). The first context 232 can then be linked within context tables to select a specific active camera at least partially based on first context 232 to capture and share video data. The selected active camera is one of front or rear cameras 132A-132B and 133A-133C.

In an additional embodiment, context database 370 can be stored at server 190 instead of within electronic device 100. Electronic device 100 can transmit a request to server 190 when the context database is needed. Server 190 can respond to the request by evaluating the context via server-maintained context database 370 and transmitting the determined context information to electronic device 100.

Figure 4:
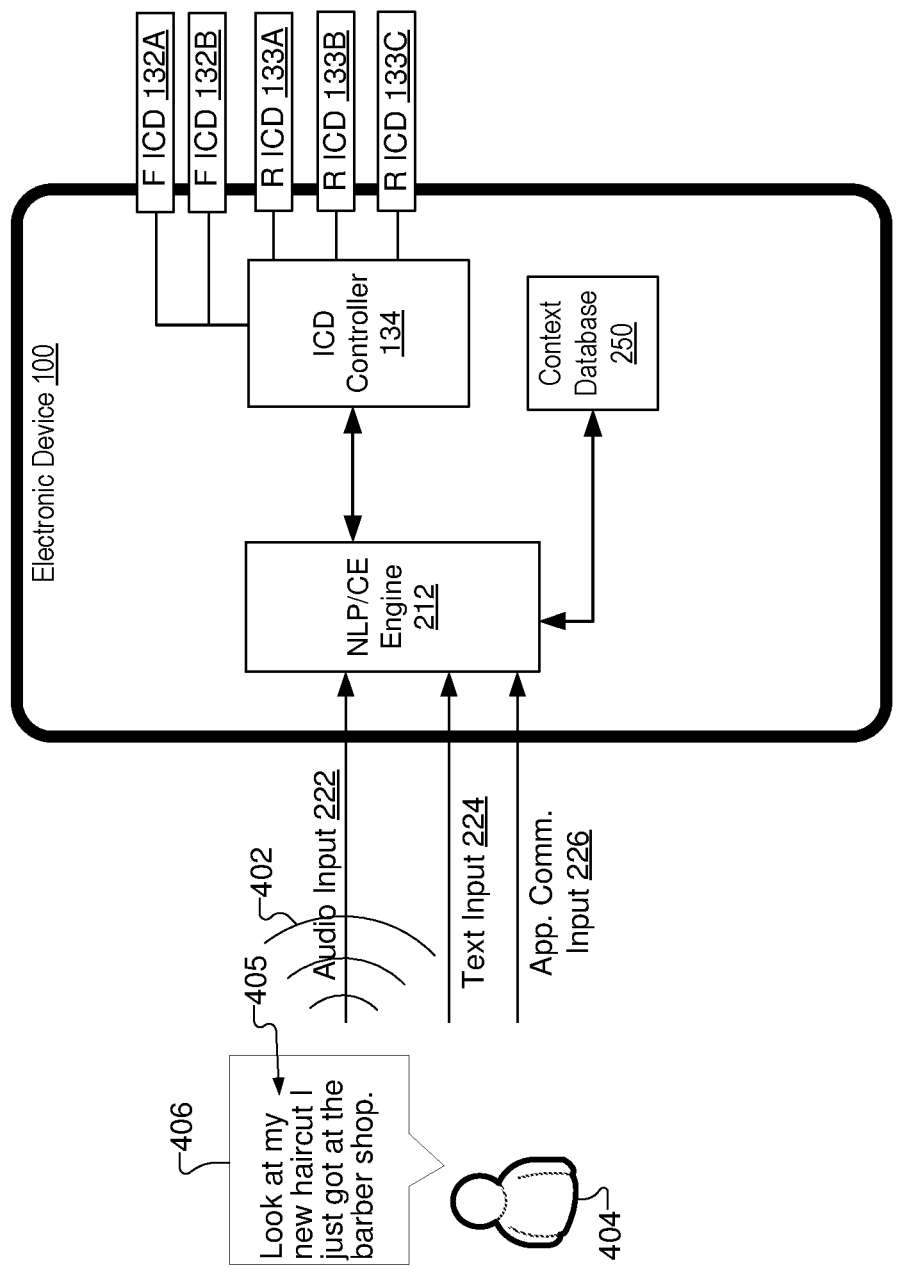
FIG. 4 illustrates an example system in which an electronic device generates a context of a non-video communication using a natural language processing/context evaluation (NLP/CE) engine, in accordance with one or more embodiments of this disclosure.

With reference to FIG. 4, an example system is presented in which electronic device 100 implements NLP/CE engine 212 to generate a context (i.e. context data 230) of/from a non-video communication (e.g., speech 406). The context is used as a secondary factor in selecting an active camera after the primary factor of eye gaze direction identifies that at least one rear facing camera is to be selected. Electronic device 100 passively listens to an audio stream 402 containing speech 406 spoken by user 404. Speech 406 of user 404 follows a natural language format, in that user 404 speaks without conscious planning or premeditation, as if speaking to another person. Speech 406 of user 404 is a natural language input that does not contain or require a wake-up word for NLP/CE engine 212 to process speech 406. Electronic device 100 and NLP/CE engine 212 can receive various types of non-video communication input. Electronic device 100 and NLP/CE engine 212 can receive audio communication input 222 (e.g., speech 406), text communication input 224, and application communication input 226.

Within electronic device 100, NLP/CE engine 212 transcribes audio stream 402 (including speech 406 uttered by user 404) into words in a text format. Electronic device 100 generates a transcription of audio stream 402 (for example, a text format representation of speech 406). More particularly, electronic device 100 generates the transcription by implementing NLP on speech 406 received within audio stream 402. After NLP/CE engine 212 generates the transcription of audio stream 402 to create text format representation of speech 405, NLP/CE engine 212 determines one or more contexts (e.g., first context 232) from the text transcription. For example, NLP/CE engine 212 can determine that the text includes keywords such as "my" and "I" that are used to identify that the speech context is related to a self-image about the speaker (i.e., the user of electronic device 100).

In one example of the NLP processes, electronic device 100 detects multiple keywords in captured speech audio and utilize those keywords to zero in on (i.e., identify) a particular context. For example, electronic device detects keywords "mountains" and "hiking" in audio stream 402 "I am hiking in the mountains", which keywords are related to an outdoor domain, and electronic device 100 determines that audio stream 402 contains speech 406 that is related to an outdoor context. In another example, electronic device 100 can detect a pairing within a context table of a keyword (for example, "skiing") and a context word (for example, "sports") received within audio stream 402 and determine (with high confidence) that audio stream 402 contains speech 406 that is related to an outdoor sporting context.

Electronic device 100 retrieves context database 250 containing context table 252 from system memory 120. Context table 252 is used to map/parse the context data (i.e., first context 232) to one or more entries within context table 252. NLP/CE engine 212 maps/parses first context 232 to one or more entries within context table 252 and identifies, based on the mapping/parsing, a corresponding correlation to one of front facing camera 132A-132B or at least one of rear facing cameras 133A-133C that is associated with the first context. For example, if the first context is related to a self-image about the speaker, the identified camera can be front facing camera 132A. Electronic device 100 can generate corresponding context identifying data 254 based on the received communication input. In one embodiment, context identifying data 254 can include the identified context and the correlation to a specific front or rear camera.

In one embodiment, the eye gaze direction 260 can be the primary factor for selecting rear facing cameras 133A-133C as the set of directional cameras from which an active camera is to be selected and the context identifying data 254 can be a secondary factor to select a specific one of rear facing cameras 133A-133C as the active camera. In another embodiment, the eye gaze direction 260 and the context identifying data 254 can each be at least partially used as a basis for selecting an active camera from among the front and rear facing cameras 133A-133C, where the priority is reversed or no priority is given to any one of the two factors.

In one embodiment, NLP/CE engine 212 is triggered when the eye gaze direction 260 of the user is determined to be looking away from the front surface of electronic device 100 and towards a direction within a field of view (FOV) of the rear facing cameras 133A-133C. In this embodiment, the eye gaze direction 260 along with context identifying data 254 is used to select an active camera from among rear facing cameras 133A-133C. In an alternate embodiment, NLP/CE engine 212 can identify a context suggesting the user is looking at an object away within a FOV of one of the rear cameras; However, the evaluation of and selection of a rear camera is then only triggered when the eye gaze direction 260 of the user is determined to be looking away from the front surface of electronic device 100 and towards the direction within the FOV of the rear facing cameras 133A-133C. With this embodiment, the eye gaze direction 260 serves as the trigger for the selection of one of rear facing cameras 133A-133C. In one or more embodiments, NLP/CE engine 212 can be triggered when the eye gaze direction 260 of the user is determined to be looking at the front surface of electronic device 100 and electronic device 100 has more than one front facing camera capturing different FOVs. With these embodiments, the eye gaze direction 260 along with context identifying data 254 can also be used to select an active camera from among front facing cameras 132A-132B.

CSCM 136 selects at least one of the front facing cameras 132A-132B or rear facing cameras 133A-133C as an active camera, based on the eye gaze direction 260 and the identified context and corresponding correlation to the cameras within context table 252 (i.e., context identifying data 254). Electronic device 100 can trigger ICD controller 134 to activate the selected camera (e.g., one of front facing cameras 132A-132B and rear facing cameras 133A-133C) for use during a video recording or communication session. ICD controller 134 receives the trigger for activating the selected camera during a video recording or video communication session.

CSCM 136 can further enable electronic device 100 to select a specific one of the rear facing cameras 133A-133C based on eye gaze direction 260 and the context identifying data 272. Electronic device 100 can identify, based on the eye gaze direction 260 and context identifying data 254, a specific one of the rear facing cameras 133A, 133B or 133C that is associated with the first context. In one embodiment, the context data (i.e., first context 232) can include several context types that are subsets of the first context and are associated respectively with one or more of the rear facing cameras. For example, if the first direction eye gaze direction 260A is facing in the direction behind rear surface 180 of electronic device 100 and first location 262A is 5 degrees left and 15 degrees down, with an audio communication input 222 of "clothing" or "dress", then one of the rear facing cameras 133A-133C with FOV of the "clothing" or "dress" at that location can be selected as the active camera.

Figure 5:
FIG. 5 is an example illustration of a context table used in determining which one of the multiple cameras to use in a video recording or video communication session, according to one or more embodiments.

FIG. 5 illustrates an example context table 252 where the eye gaze direction 260 and the context identifying data 254, which is generated based on received communication input 220 (FIG. 2) (e.g., audio or text), are used, respectively, as a primary and a secondary factor in selecting one of the multiple cameras (i.e., front cameras 132A-132B or rear cameras 133A-133C). Context table 252 is used after electronic device 100 has received contextual input while determining an eye gaze direction indicates that one of the rear cameras is to be used to capture video images. Context table 252 includes columns of data representing eye gaze direction 260 and context identifying data 254, which includes context identifiers 510 and context types 520. Context table 252 also includes columns for active camera indication from among front ICD 132A and multiple rear ICD(s) 133A-133C. Within these active camera indication columns, a single one of the multiple cameras is selected, as identified by an X, based primarily on the directional gaze of the user (eye gaze direction 260) and secondarily by the context identifying data 254 broken down into context identifier 510 and context type 520. Eye gaze direction 260 corresponds generally to one of the two main directions relative to the electronic device 100, i.e., the front display of electronic device 100 or past the rear of electronic device 100, towards the FOV of one or more of rear ICDs 133A-133C.

In one embodiment, eye gaze direction 260 is first detected and determined to be front or rear (i.e., towards the front display or towards the rear of the device). According to one embodiment, and as illustrated within context table 252, if the user is looking towards the display (i.e., the front camera detects the user's eye gaze is in the direction of the display), the selected camera would default to be front facing camera 132A, regardless of what the context of the detected user's speech may be. This default selection of front facing camera 132A is indicated in context table 252 by the "X" placed in the first row of the column for front facing ICD 132A.

As introduced above, communication input 220 (FIG. 2) can be received contemporaneously with the detection of the eye-gaze direction of the user and used to generate context identifying data 254. In another example illustrated by the first camera selecting row of context table, if the user is looking away from the display 130 in a direction (or towards a location) that is behind the electronic device, while the user's speech is analyzed by NLP/CE engine 212 to provide context identifying data 254 including context identifier 510 as "self-image" and context type 520 is "speaker", the selected camera would remain front facing camera 132A as indicated by an "X" in the box under the front facing camera 132A in the first row of context table 252. This prevents the electronic device from incorrectly switching to a rear camera when the user becomes distracted with something in the background that the user does not intend to share with the second user. As an example of such a distraction, a child or pet coming into a room while the user is on a conference call, would cause the user's eye gaze to shift away from the device display; However, the user does not want to show to the other participants on the video conference the child or dog that has entered into the FOV of the rear camera(s).

In response to determining that the user's eye gaze direction is behind the electronic device 100, processor 102 of electronic device 100 uses NLP/CE engine 212 to generate context data 230, then accesses context table 252 to identify, a context identifier 510 and/or sub-context/context type 520 of the received non-video communication input 220 (FIG. 2) by mapping context data 230 (FIG. 2) to/within context table 252. Processor 102 then identifies from context table 252 a corresponding one of front facing camera 132A or one of rear facing cameras 133A-133C that is associated with the identified context.

In an additional example presented by the fifth camera selection row of context table 252, if the user's eye gaze shifts to an eye gaze direction behind the electronic device 100 and the user contemporaneously utters "wow, what a nice car", electronic device 100 can determine that the eye gaze direction 505 is behind electronic device 100, indicated by the "rear" tag within first column, eye gaze direction 260, and that one of the rear facing cameras 133A-133C is to be used. NLP/CE engine 212 analyzes the user's speech to determine the context and provide that context identifier 510 is "object" and the context type 520 is "large (moving) object". Processor maps this context data within fifth row of context table 252 and selects the corresponding rear facing wide angle camera 133B, which is indicated by the "X" under the associated column for rear facing wide angle camera 133B in context table 252. The selection enables processor to activate rear facing wide angle camera 133B to capture an image of the car within the FOV of the selected rear facing wide angle camera 133B.

Figure 6B:
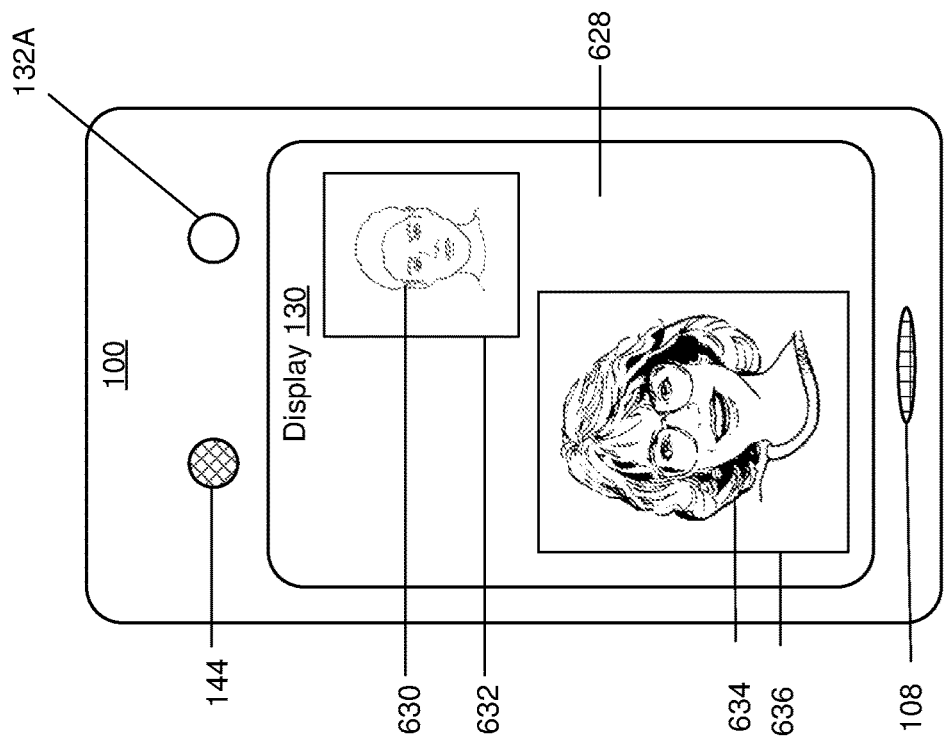
FIG. 6B illustrates content on a display of the electronic device of FIG. 6A, according to one or more embodiments.
Figure 6A:
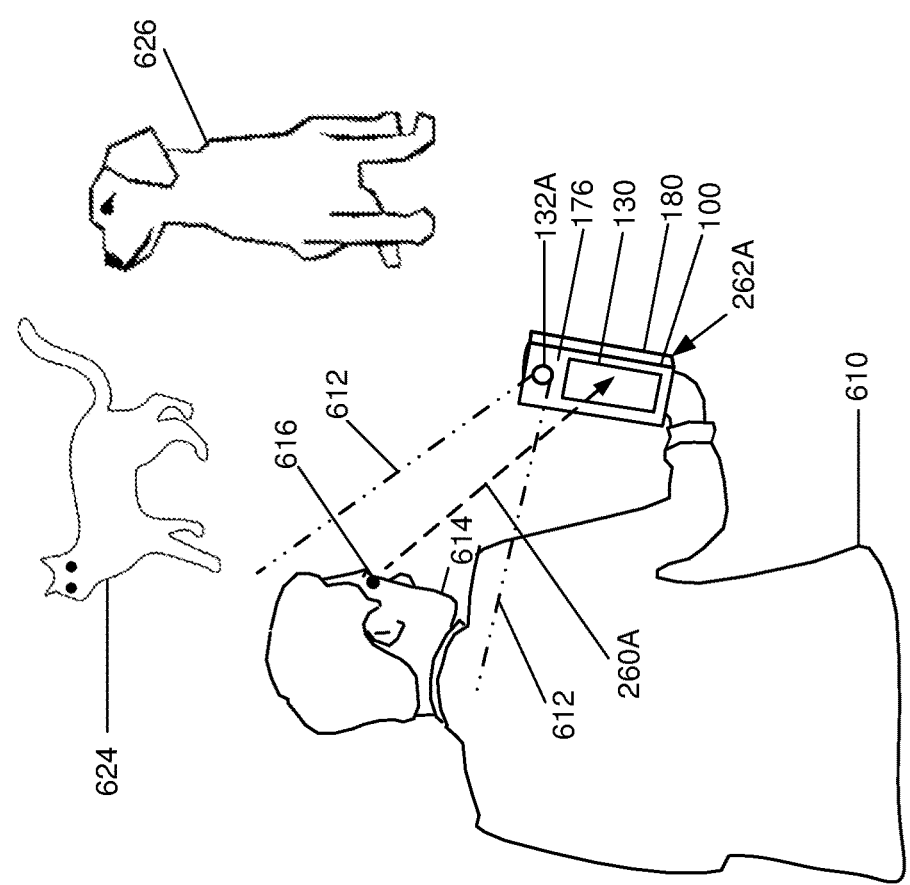
FIG. 6A is an example illustration of an electronic device in a video communication session with a second electronic device, according to one or more embodiments.

FIGS. 6A and 6B illustrate electronic device 100 in a video communication session 386 with second electronic device 300 (FIG. 3) via a communication interface established with wireless network 150. Referring to FIG. 6A, electronic device 100 is shown in a video communication session by user 610. In one embodiment, video communication session 386 can be a video call. Front facing camera 132A has a field of view (FOV) 612 that captures an image stream 240 including first image 242 containing the face 614 of user 610. The face 614 of the user 610 includes a pair of eyes 616 that are looking in first gaze direction 260A. In FIG. 6A, the user is looking at display 130 embedded in front surface 176 of electronic device 100 and the eye gaze direction 260A is oriented toward display 130. First location 262A is at the same location as electronic device 100. A cat 624 and a dog 626 are located away from electronic device 100 and are located behind rear surface 180.

According to one aspect of the disclosure, CSCM 136 enables electronic device 100 to recognize the face 614 of a user and to track the eyes 616 of the user to determine first eye gaze direction 260A. More specifically, CSCM 136 enables electronic device 100 to detect the presence of eyes within a FOV of front facing camera 132A, to identify precise eye positions and to determine an eye gaze direction based on the eye positions. In one embodiment, first eye gaze direction 260A is not determined until the users gaze has rested (i.e., remained constant) for a preset minimum amount of time (i.e., eye gaze threshold time 218) on the same specific area (i.e., within a small deviation in general direction). In one embodiment, for example, eye gaze direction 260A is not determined until the user's gaze has rested on a specific area for more than 2-3 seconds. The exact value of the preset minimum amount of time can be a variable that has a default value or a value based on the current device/application setting, which can be modified/adjusted by the user to be more or less sensitive to changes in eye gaze direction.

With reference now to FIG. 6B, electronic device 100 is illustrated with an example graphical user interface (GUI) 628 presented on display 130 during video communication session 386. GUI 628 includes captured image/video window 632 and received image/video window 636. The captured video image 630 of user 610 captured by front facing camera 132A is shown in captured image/video window 632 on display 130. The captured video image 630 can be transmitted to second electronic device 300 as part of video communication session 386. A received image or video stream 634 of a user of second electronic device 300 is shown in received image/video window 636 on display 130.

Figure 6D:
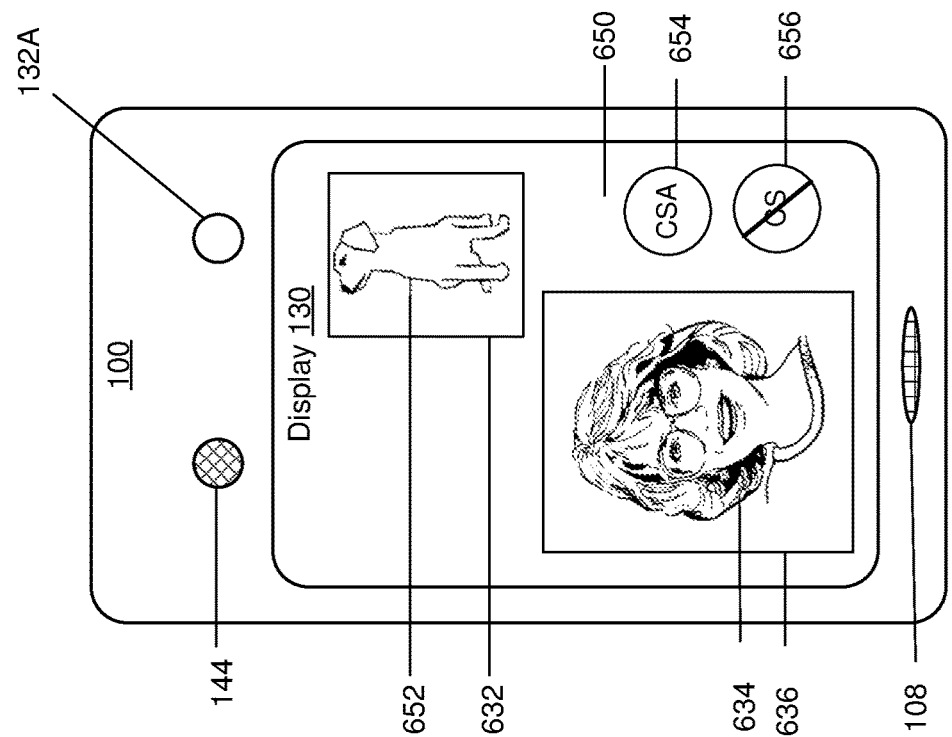
FIG. 6D illustrates content of a display of the electronic device of FIG. 6C, according to one or more embodiments.
Figure 6C:
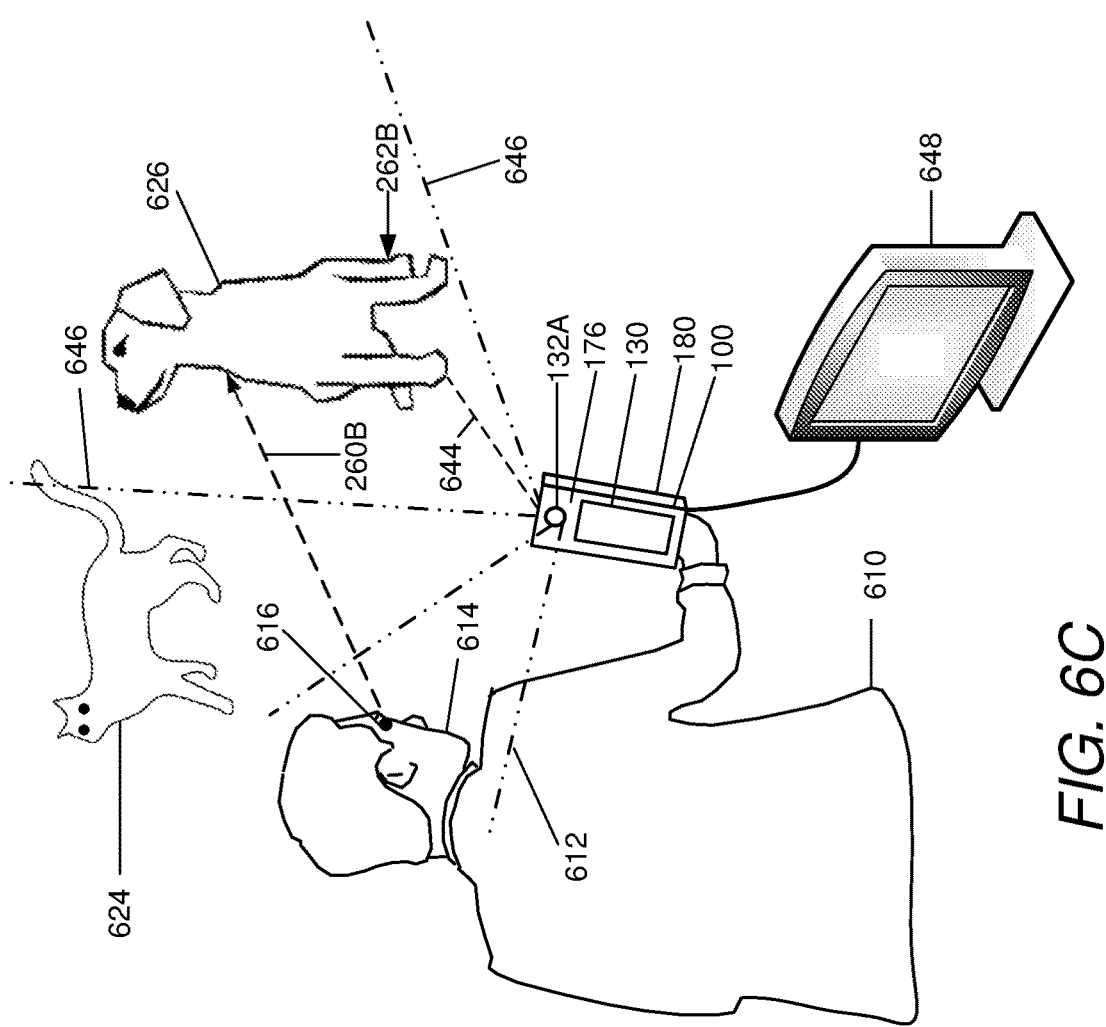
FIG. 6C is an example illustration of an electronic device in a video communication session with a second electronic device, where the electronic device has selected a camera based on eye gaze direction of a user, according to one or more embodiments.

Referring to FIG. 6C, electronic device 100 is further shown continuing video communication session 386 by user 610. In FIG. 6C, user 610 has looked away from front surface 176 and display 130 in a second eye gaze direction 260B towards dog 626. Dog 626 is located in second location 262B, which is offset to the rear of electronic device 100 at a distance 644 away from electronic device 100. Dog 626 is located facing rear surface 180 and is in a FOV 646 of at least one of rear facing cameras 133 A-C (FIG. 1C). A secondary display device 648 is communicatively coupled to electronic device 100. In one embodiment, electronic device 100 can transmit captured video data 270 to secondary display device 648 for presentation of images/video thereon.

CSCM 136 enables electronic device 100 to capture, via front facing camera 132A, an image stream 240 including second image 244 containing a face 614 of user 610 and determine second eye gaze direction 260B, by processor 102 processing second image 244 retrieved from image stream 240. Second eye gaze direction 260B corresponds to second location 262B where the user is looking. In one or more embodiments, CSCM 136 enables electronic device 100 to determine second location 262B at least partially based on second eye gaze direction 260B and on camera parameters 264, including distances to objects within a FOV.

CSCM 136 further enables processor 102 of electronic device 100 to determine if the user is looking away from the front surface 176 and towards a location behind electronic device 100 (i.e., towards a location that can be captured within a FOV of at least one of the rear facing cameras) for more than a threshold amount of time. In response to processor 102 determining that the user's eye gaze is in a direction within the FOV of at least one of the rear cameras, and in part based on a context determined from processing, by NLP/CE engine, of detected speech of the user, processor 102 triggers ICD controller 134 (FIG. 1A) to select as an active camera, a corresponding one of at least one rear facing cameras 133A-133C with a FOV 646 towards second eye gaze direction 260B and containing second location 262B to which the user 610 is looking. In the example of FIG. 6C, rear facing main camera 133A can be selected as the active camera with a FOV 646 that includes dog 626 when the user says "my dog is so adorable" contemporaneously with fixing his/her gaze in direction of dog 626. CSCM 136 further enables electronic device 100 to activate rear facing main camera 133A and to capture images (e.g., image/video data 270) within the FOV 646 of the activated camera.

Turning to FIG. 6D, electronic device 100 is illustrated with an example GUI 650 presented on display 130 during video communication session 386. GUI 650 includes captured image/video window 632, received image/video window 636, camera switching/selection activation (CSA) icon 654, and cancel selection (CS) icon 656. The captured video/image 652 of dog 626 captured by rear facing main camera 133A is shown in captured image/video window 632 on display 130. The captured video/image 652 can be transmitted to second electronic device 300 as part of video communication session 386. A received image or video stream 634 of a user of electronic device 300 is shown in received image/video window 636 on display 130. CSA icon 654 is a CSA option that allows a user to choose the selected rear facing camera to be active in video communication session 386. CSA icon 654, when selected by a user via touch screen interface 131, triggers electronic device 100 to switch from using front facing camera 132A to using the selected rear facing main camera 133A during video communication session 386. CSA icon 654 (CSA option) enables device to proceed with switching to capture video/images, based on the user's eye gaze direction, using the selected rear facing camera 133A. CS icon 656, is an option that when selected by a user via touch screen interface 131, cancels the pre-selection of a rear camera and causes electronic device 100 to continue using the current active front camera to capture images/video.

According to one aspect of the disclosure, electronic device 100 can automatically monitor an eye gaze direction and select which specific rear camera to use when the eye gaze direction of a user changes to looking away from the front surface of electronic device 100 in a direction that is towards the rear of the device and/or within a FOV of one of the rear cameras. By automatically selecting which rear camera to use, electronic device 100 frees the user from the task of having to manually switch to a rear camera when the user's eye gaze location changes or when communication context calls for such selection. Additionally, in one or more embodiments, electronic device 100 also frees the user from the task of trying to select which rear camera, from among multiple rear cameras having a FOV that contains the target location, is optimal to use during a video communication session 386.

According to another aspect of the disclosure, electronic device 100 can present a CSA icon 654 that allows the user to choose the selected rear facing camera to be active in the video communication session. In one or more embodiments, CSA icon 654 and rear image/video 652 may be removed from display 130 if CSA icon 654 is not selected within a preset time period (e.g., 5 seconds). Additionally, in one or more embodiments, a cancel selection (CS) icon 656 is also presented on display 130. The user can optionally decide to not switch to the rear camera, and CS icon 656 can be selected to cancel the switching of the cameras and return the display 130 to showing image/video captured by the active camera (i.e., the front facing camera).

Figure 6F:
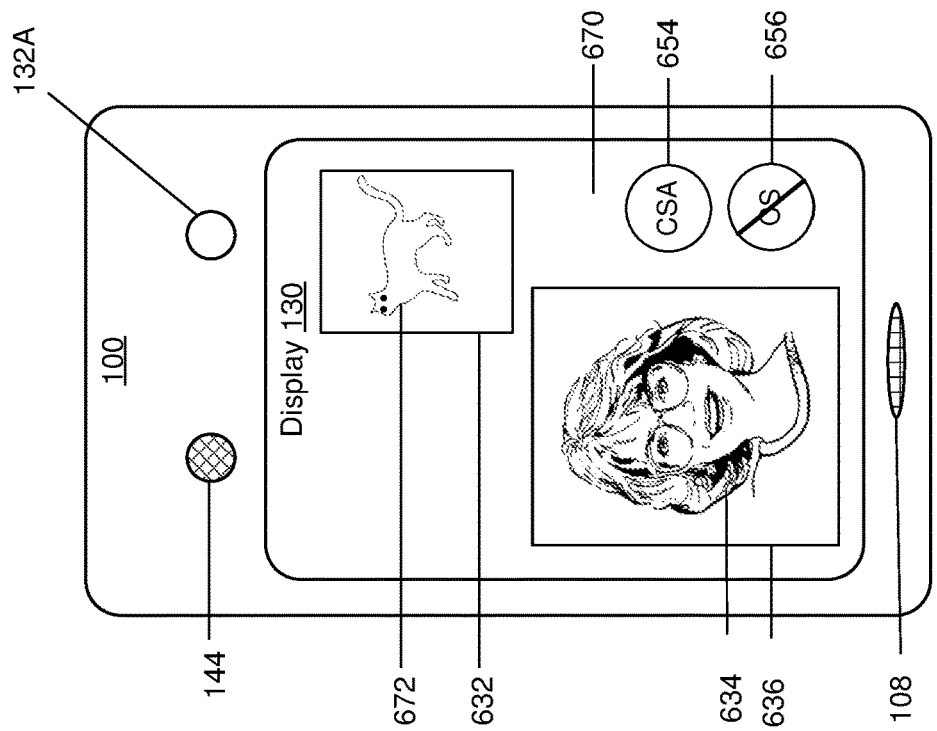
FIG. 6F illustrates content of a display of the electronic device of FIG. 6E, according to one or more embodiments.
Figure 6E:
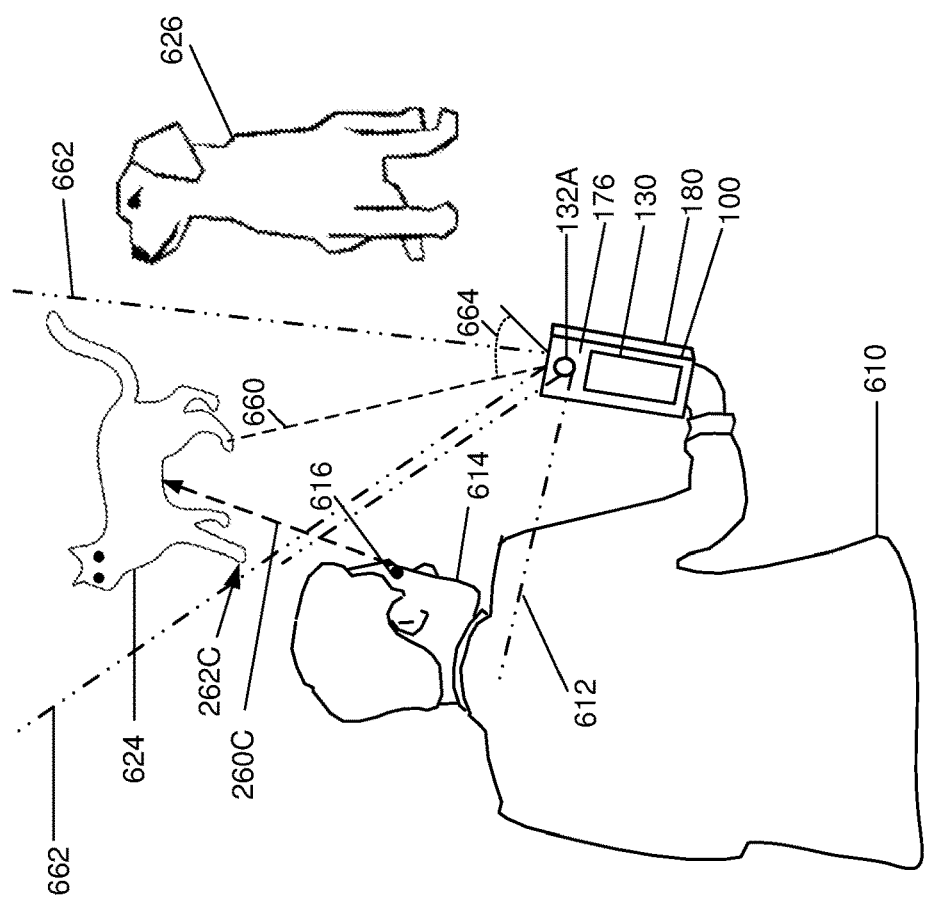
FIG. 6E is an example illustration of an electronic device in a video communication session with a second electronic device, where the electronic device has selected a camera based on a different eye gaze direction of a user, according to one or more embodiments.

With reference to FIG. 6E, electronic device 100 is further shown continuing video communication session 386 by user 610. In FIG. 6E, user 610 has looked away from dog 626 and is now looking at cat 624. User 610 is looking in third eye gaze direction 260C towards cat 624. Cat 624 is located in third location 262C facing rear surface 180 and is in a FOV 662 of at least one of rear facing cameras 133 A-C (FIG. 1C). Cat 624 is located at a distance 660 and directional angle 664 away from an axis perpendicular to the rear surface of electronic device 100.

CSCM 136 enables electronic device 100 to capture, via front facing camera 132A, an image stream 240 including third image 246 containing a face 614 of user 610 and determine, via processor 102, third eye gaze direction 260C based on third image 246 retrieved from the image stream 240. Third eye gaze direction 260C corresponds to third location 262C where the user is looking. CSCM 136 further enables electronic device 100 to determine third location 262C at least partially based on third eye gaze direction 260C, and on any context determined from detected and analyzed speech of the user, and on camera parameters 264 including distances to objects within a FOV received from at least one of rear facing cameras 133A-133C.

CSCM 136 further enables electronic device 100 to track a current eye gaze direction by monitoring and periodically analyzing the third image 246 corresponding to image stream 240 from front facing camera 132A to identify a current eye gaze direction (e.g., third eye gaze direction 260C). CSCM 136 further enables electronic device 100 to determine if the current eye gaze direction indicates a current location (i.e., third location 262C) that is different from the second location 262B. In response to determining that the current location (i.e., third location 262C) is different from the second location 262B, electronic device 100 determines, based on the current eye gaze direction (i.e., third location 262C), if the user 610 is looking away from the front surface 176 of electronic device 100 towards the rear of the electronic device 100 (i.e., a location within the FOV of one or the rear cameras). In response to determining that the user is looking towards the rear of the device and identifying the corresponding location, AI engine 214 enables electronic device 100 to generate at least one new camera setting 266 of the active camera (i.e., rear camera 133A) based on the current eye gaze direction (i.e., third eye gaze direction 260C) and adjust the active camera (i.e., rear camera 133A) using the generated at least one camera setting 266.

In one embodiment, adjusting the active camera using the generated new camera settings 266 can include adjusting a directional setting of the rear facing camera 133A to focus the FOV 662 of rear facing camera 133A on the current location (i.e., third location 262C) determined from the current eye gaze detection (i.e., third eye gaze direction 260C). In another embodiment, adjusting the active camera using the generated new camera settings 266 can include adjusting a zoom level of the rear facing camera 133A to magnify captured images of the current location (i.e., third location 262C). Other camera settings adjustments can be made based on the detected amount of light and other exposure settings for the current location.

In an additional embodiment, the identified current eye gaze direction (i.e., third eye gaze direction 260C) can be used to select a different rear facing camera so that the current eye gaze location (i.e., third location 262C) is optimally captured within FOV 662. For example, because cat 624 in third location 262C is farther away from electronic device 100, electronic device 100 may select a telephoto camera (i.e., rear facing camera 133C) to capture an optimal image of cat 624.

Turning to FIG. 6F, electronic device 100 is illustrated with an example GUI 670 presented on display 130 during video communication session 386. GUI 670 includes captured image/video window 632, received image/video window 636, CSA icon 654, and CS icon 656. The captured video image 672 of cat 624 captured by rear facing main camera 133A is shown in captured image/video window 632 on display 130. AI engine 214 enables electronic device 100 to generate optimal camera settings 268 and to adjust the camera settings such that captured video image 672 is optimized for size (zoom) and position (directional setting). The received video stream 634 of a user of second electronic device 300 is shown in received image/video window 636 on display 130.

According to one additional aspect of the disclosure, electronic device 100 can be used to automatically track the eye gaze direction of a user by monitoring and periodically analyzing image 246 and to adjust camera settings when the current eye gaze direction of a user changes to a different eye gaze direction. By automatically tracking the eye gaze direction of the user, electronic device 100 frees the user from the task of having to manually zoom and pan images using touch screen 131 during video communication session 386 or during a video recording.

Figure 7B:
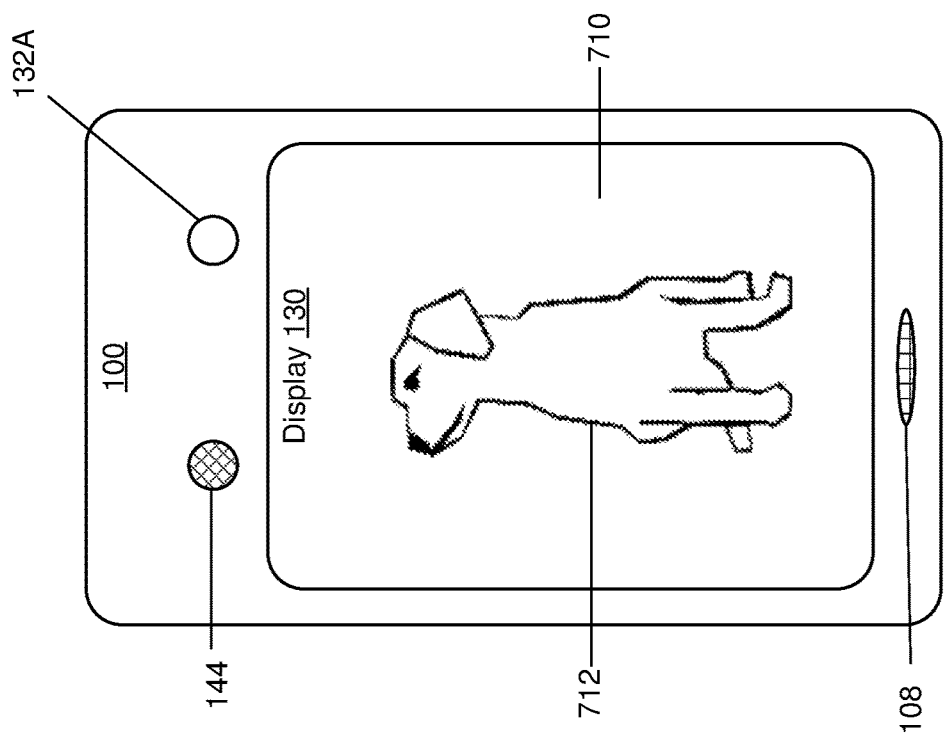
FIG. 7B illustrates content of a display of the electronic device of FIG. 7A, according to one or more embodiments.
Figure 7A:
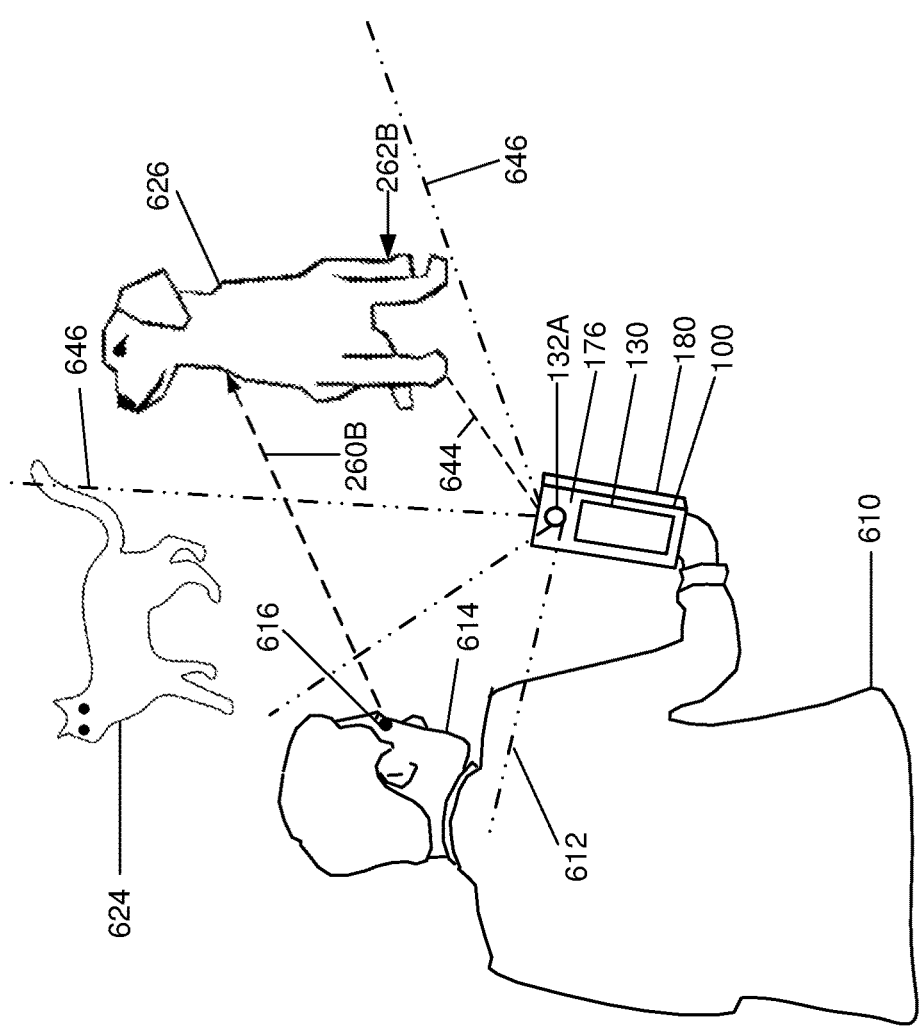
FIG. 7A is an example illustration of an electronic device that is recording video images, according to one or more embodiments.

FIG. 7A illustrates electronic device 100 being used to record or capture video data 270 by a user 610. Dog 626 is within FOV 646 of the active camera (i.e., rear facing main camera 133A). In one embodiment, user 610 may reference dog in captured speech and look towards dog 626. In FIG. 7A, user 610 is now looking at dog 626 and electronic device 100 determines the context of user 610 speech indicates that the dog is likely at a corresponding location to the eye gaze direction that is within the FOV of a rear camera. Electronic device 100 thus switches to recording video data 270 of second location 262B that is a distance 644 away from electronic device 100, using rear facing main camera 133A. In one embodiment, the initial captured video data can be a self-video, as in a blog, where the user is initially looking at the front camera while recording himself/herself speaking. Electronic device 100 thus switches to a specific one of the rear cameras based on the combination of which direction the user fixes his eye gaze and the context determined from the spoken speech of the user.

Turning to FIG. 7B, electronic device 100 is illustrated with an example GUI 710 presented on display 130 during video recording. GUI 710 includes video image 712. The captured video image 712 of dog 626, captured by rear facing main camera 133A, is shown.

Figure 7D:
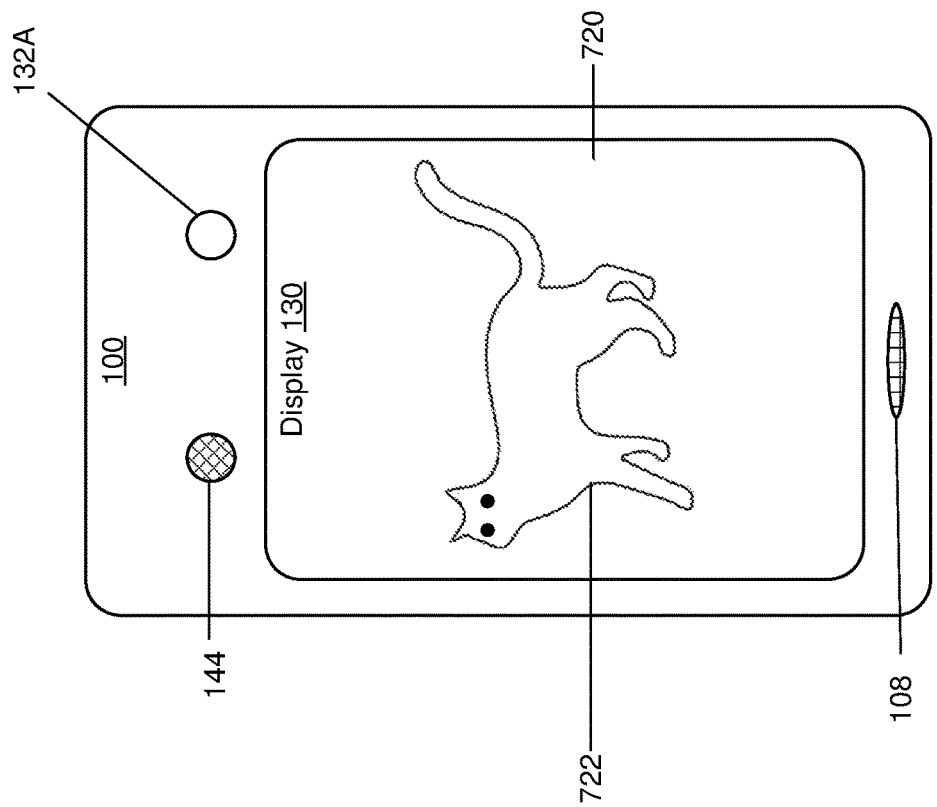
FIG. 7D illustrates content of a display of the electronic device of FIG. 7C, according to one or more embodiments.
Figure 7C:
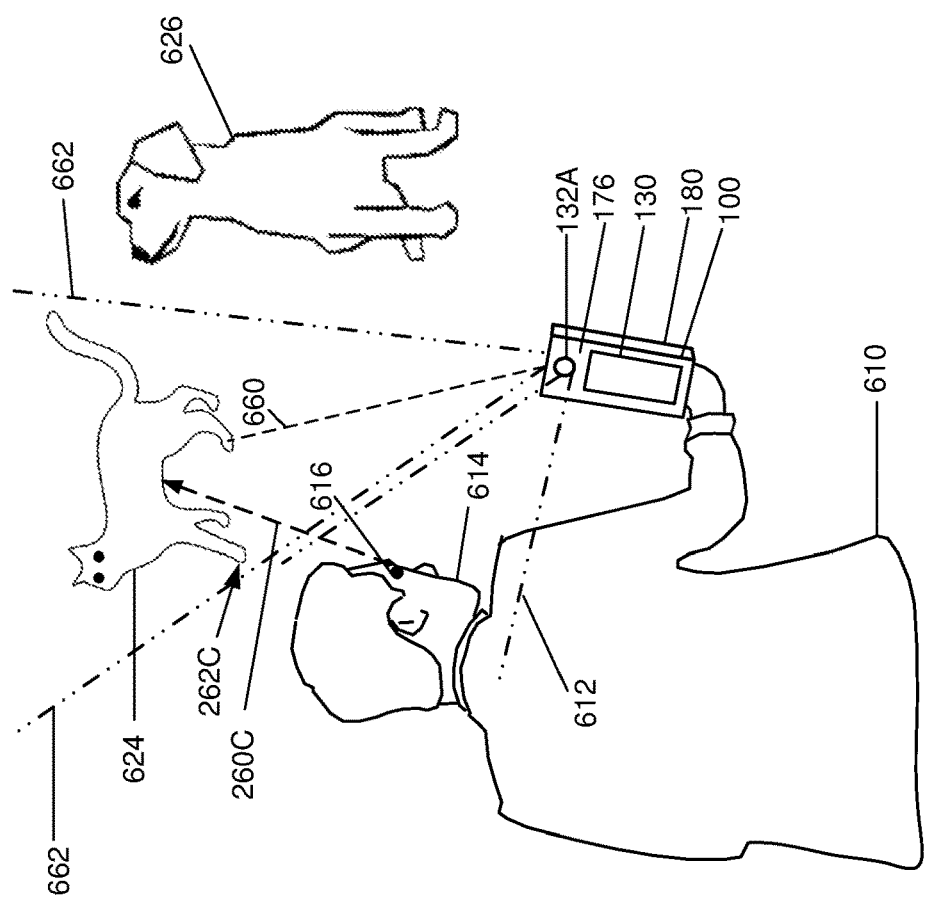
FIG. 7C is an example illustration of an electronic device that is recording video images, where the electronic device has adjusted camera settings based on eye gaze direction of a user, according to one or more embodiments.

Referring to FIG. 7C, electronic device 100 is further shown after the eye gaze direction of a user has changed during video recording. In FIG. 7C, user 610 has looked away from dog 626 and is now looking at cat 624. User 610 is looking in third eye gaze direction 260C towards cat 624. Cat 624 is located facing rear surface 180 in third location 262C that is a distance 660 away from electronic device 100. Cat 624 is in a FOV 662 of at least one of rear facing cameras 133 A-C (FIG. 1C).

CSCM 136 enables electronic device 100 to capture, via front facing camera 132A, an image stream 240 including third image 246 containing a face 614 of user 610 and determine, via processor 102, third eye gaze direction 260C based on third image 246 retrieved from the image stream 240. Third eye gaze direction 260C corresponds to third location 262C where the user is looking. CSCM 136 further enables electronic device 100 to determine third location 262C at least partially based on third eye gaze direction 260C, context determined from detected and analyzed speech of the user, and on camera parameters 264 including distances to objects within a FOV received from at least one of rear facing cameras 133A-133C.

CSCM 136 further enables electronic device 100 to track a current eye gaze direction by monitoring and periodically analyzing the third image 246 corresponding to image stream 240 from front facing camera 132A to identify a current eye gaze direction (i.e., third eye gaze direction 260C). CSCM 136 further enables electronic device 100 to determine if the current eye gaze direction indicates a current location (i.e., third location 262C) that is different from the second location 262B. In response to determining that the current location (i.e., third location 262C) is different from the second location 262B, electronic device 100 determines, based on the current eye gaze direction (i.e., third location 262C), if the user 610 is looking away from the front surface 176 of electronic device 100 towards an area located behind electronic device 100 that is within a field of view of one of the rear cameras. In response to determining that the user is looking away from the front surface 176 and towards an area located behind electronic device 100 that is within a field of view of one of the rear cameras, AI engine 214 enables electronic device 100 to select an active camera from among the at least one rear cameras and generate at least one camera setting 266 of the selected active camera (i.e., rear camera 133A) based on the current eye gaze direction (i.e., third eye gaze direction 260C) and adjust the active camera (i.e., rear camera 133A) using the generated at least one camera setting 266 during the recording of video data 270.

In one embodiment, adjusting the active camera using the generated camera settings 266 can include adjusting a directional setting of the rear facing camera 133A to focus the FOV 662 of rear facing camera 133A on the current location of cat 624 (i.e., third location 262C) where the user is looking, as determined from the current eye gaze detection (i.e., third eye gaze direction 260C). In another embodiment, adjusting the active camera using the generated camera settings 266 can include adjusting a zoom level of the rear facing camera 133A to magnify captured images of the current location (i.e., third location 262C).

In an additional embodiment, the identified current eye gaze direction (i.e., third eye gaze direction 260C) can be used to select a different rear facing camera that allows the current location (i.e., third location 262C) to be optimally captured within that camera's FOV 662. For example, because cat 624 in third location 262C is farther away from electronic device 100, electronic device 100 may select a telephoto camera (i.e., rear facing camera 133C) to capture an optimal image of cat 624, versus the previously-selected, main rear facing camera 133A to capture the image of dog 626.

Turning to FIG. 7D, electronic device 100 is illustrated with an example GUI 720 presented on display 130 during video recording. GUI 720 includes video image 722. The captured video image 722 of cat 624, captured by rear facing main camera 133A, is shown.

Figure 8B:
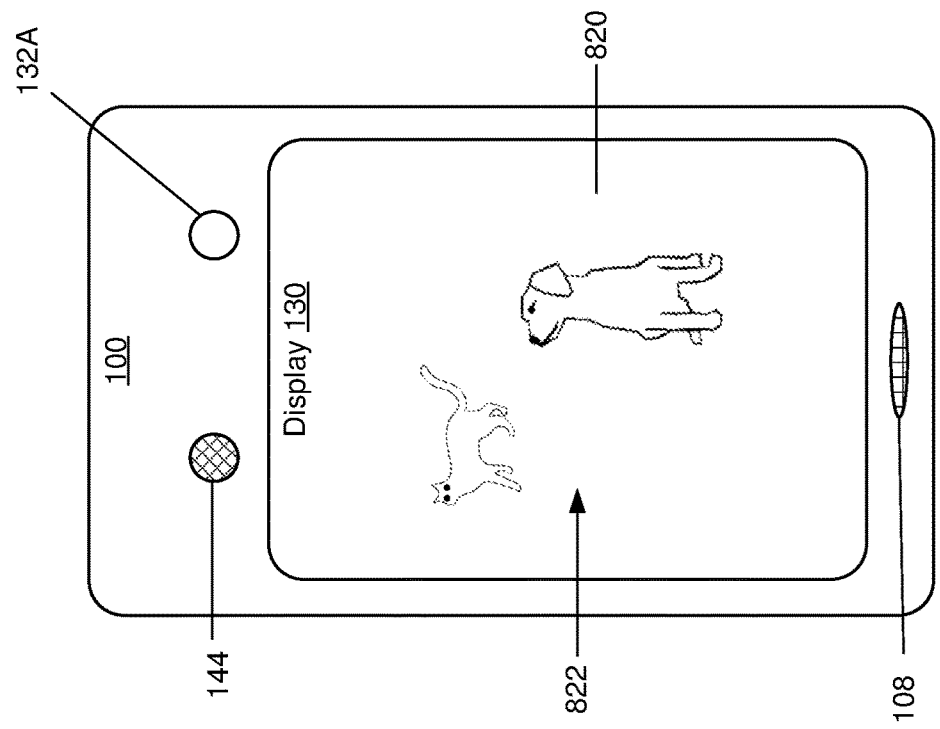
FIG. 8B illustrates a display of the electronic device of FIG. 8A, according to one or more embodiments.
Figure 8A:
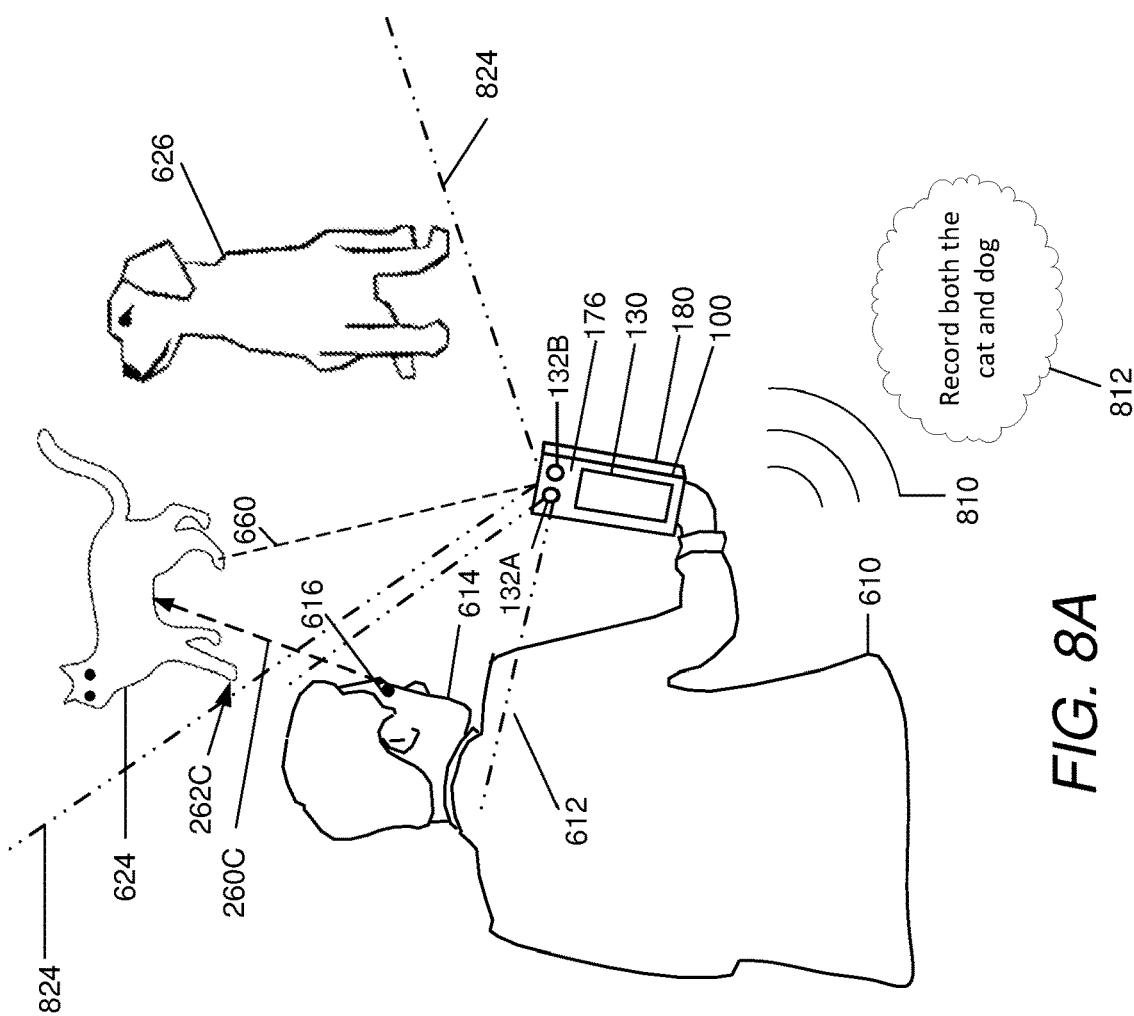
FIG. 8A is an example illustration of an electronic device selecting a camera for use to capture video images based on eye gaze direction and on the context of an audio communication input, according to one or more embodiments.

FIG. 8A illustrates electronic device 100 being used to record or capture video data 270 by a user 610. In FIG. 8A, user 610 is looking at cat 624 and is recording video data 270 of third location 262C that is a distance 660 away from electronic device 100 using rear facing main camera 133A. Electronic device 100, using microphone 108, listens to an audio stream 810 containing speech 812 spoken by user 610. NLP/CE engine 212 enables electronic device 100 to transcribe speech 812 into words in a text format. NLP/CE engine 212 enables electronic device 100 to determine one or more contexts (i.e., first context 232) from the text transcription and to map/parse the first context 232 to one or more entries within context table 252. For example, electronic device 100 can determine that the text includes keywords such as "Dog" and "Cat" that are used to identify that the first context 232 includes "animals".

CSCM 136 enables electronic device 100 to identify, based on the mapping/parsing, a corresponding one of rear cameras 133A-133C that is associated with the first context 232. For example, if the first context 232 is "animals", while the user is gazing at a location to the rear of electronic device 100, electronic device 100 can identify the video should be captured using a rear facing camera that has a FOV that can capture the animals within the FOV of location 262C. Electronic device 100 can select wide FOV camera 133B as the active camera, based primarily on the eye gaze location and at least partially based on the first context 232. Wide angle camera 133B has a FOV 824 that captures both cat 624 and dog 626. Electronic device 100 can trigger ICD controller 134 to activate the selected rear facing camera (i.e., wide angle camera 133B) for use during video recording. In another embodiment, CSCM 136 enables electronic device 100 to generate camera settings 266 for the active camera based at least partially on the first context 232 and to adjust the active camera using the generated camera settings, such that both cat 624 and dog 626 are in FOV 824. For example, electronic device 100 can change directional settings and zoom levels of the active camera to capture both cat 624 and dog 626 within FOV 824.

In another embodiment, CSCM 136 enables electronic device 100 to identify, based on the mapping/parsing, a corresponding one of front cameras 132A-132B that is associated with the first context 232. For example, if the first context 232 is "self-image", while the user is gazing at a location to the front of electronic device 100, electronic device 100 can identify the video should be captured using one of the front facing cameras 132A-132B that has a FOV that can capture the self-image of the user 610.

According to one aspect of the disclosure, electronic device 100 can automatically determine and select which camera to use during video recording at least partially based on the user's eye gaze direction and at least partially based on received audio input. According to another aspect of the disclosure, electronic device 100 can automatically generate and adjust camera settings during video recording, at least partially based on received audio input.

Turning to FIG. 8B, electronic device 100 is illustrated with an example GUI 820 presented on display 130 after the audio input of FIG. 8A has been received. GUI 820 includes video image 822. The captured video image 822 includes both the cat and dog that has been captured by the selected rear facing wide FOV camera 133B.

In one embodiment, processor 102, executing CSCM 136, captures, via front facing camera 132A, image stream 240 containing a face 614 of user 610 and determines second eye gaze direction 260B based on second image 244 retrieved from the image stream 240. The second eye gaze direction 260B corresponds to second location 262B where the user is looking. Processor 102 determines if the user 610 is looking away from the front surface 176 of electronic device 100 and towards a direction that is behind the rear surface of electronic device and thus within a FOV of one of the rear facing cameras 133A-133C. In response to determining that the user 610 is looking towards a direction behind the rear surface 180 of electronic device 100 that is within a FOV of one of the rear facing cameras, processor 102 selects as an active camera, a corresponding one of rear facing cameras 133A-133C with a FOV 646 containing second location 262B to which the user 610 is looking.

Figure 9A:
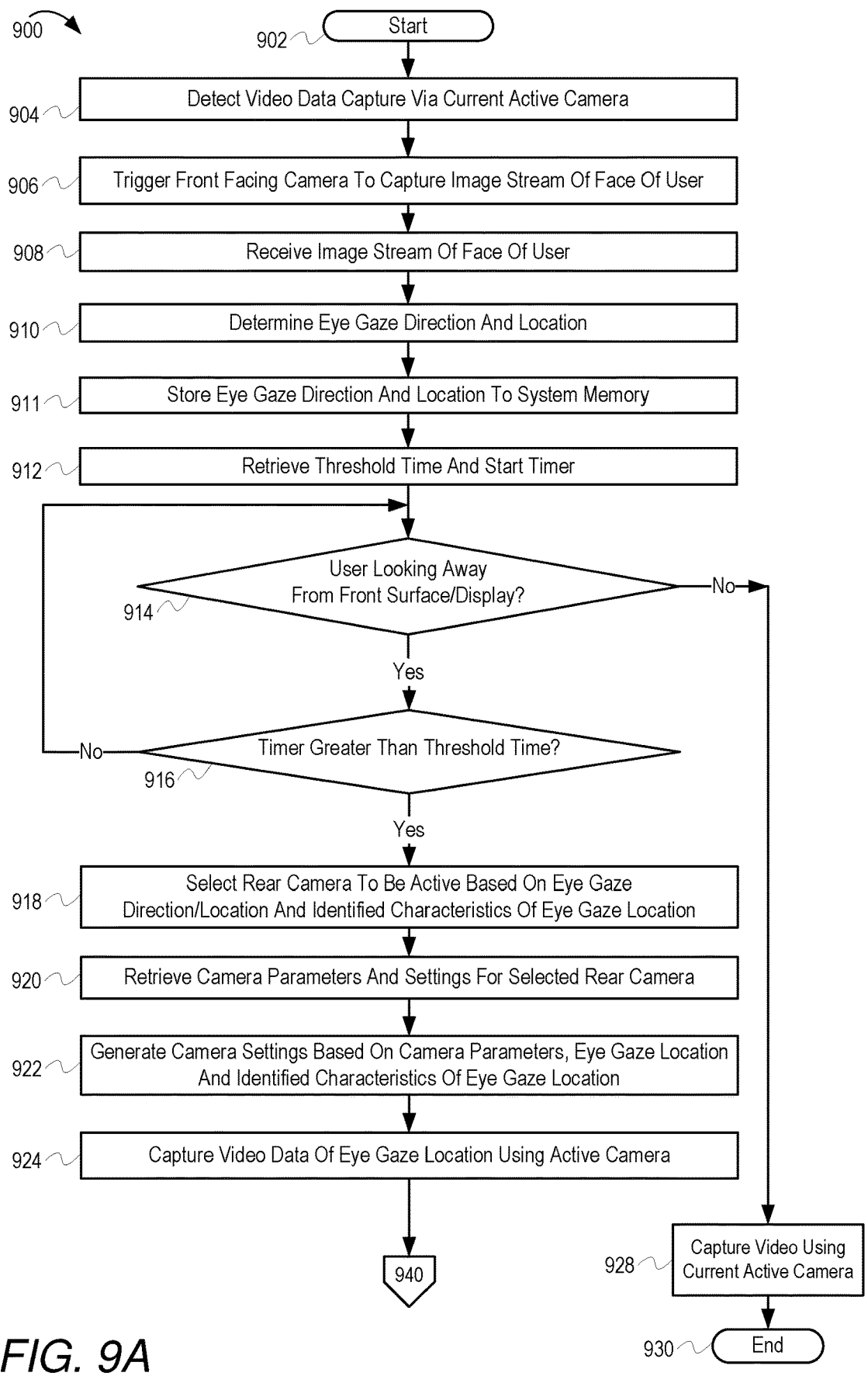
FIGS. 9A-9B depict a flowchart of a method by which an electronic device selects a rear facing camera to be an active camera and generates camera settings for use by the electronic device to capture video images, based on the eye gaze direction of a user, according to one or more embodiments.
Figure 9B:
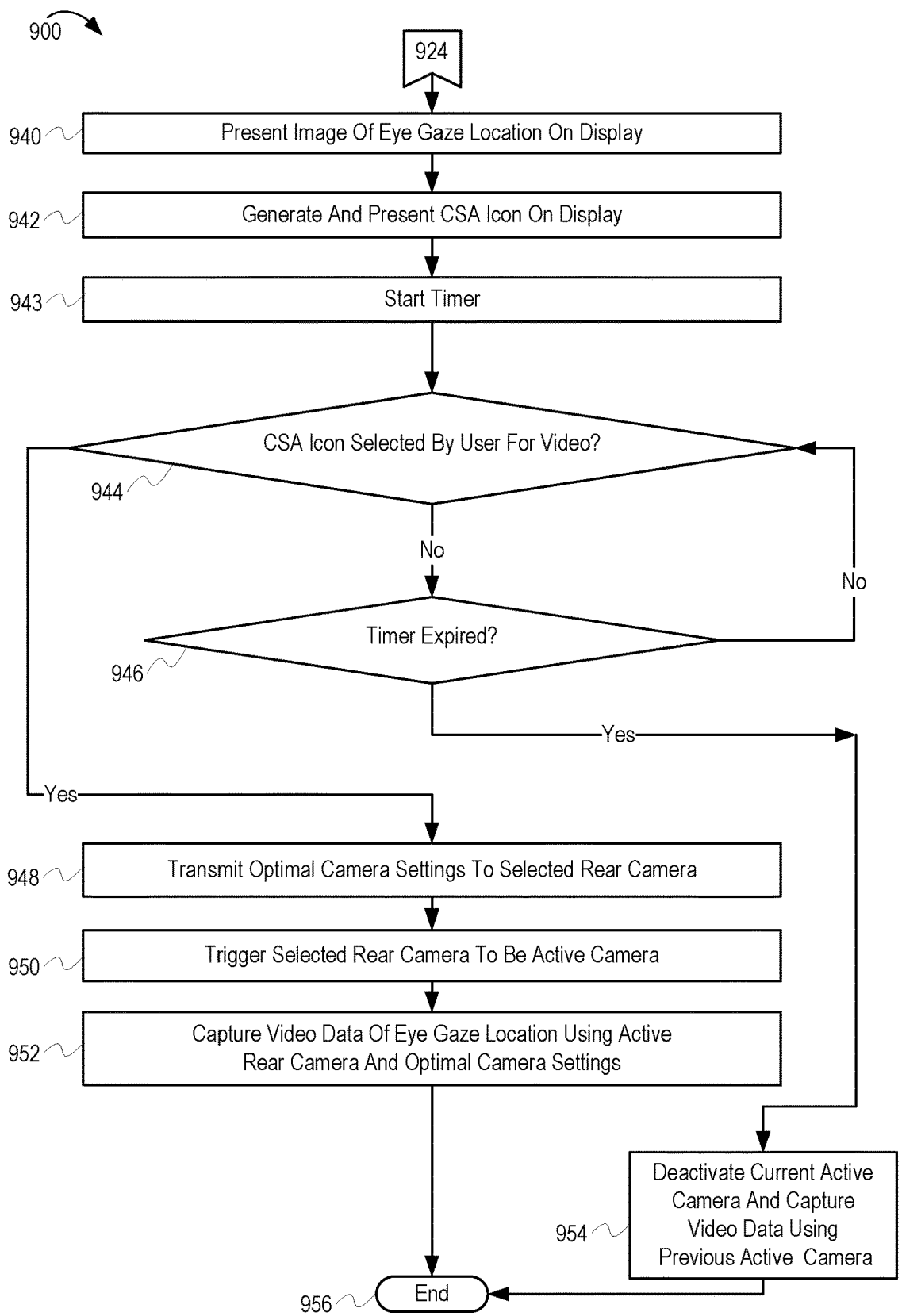
Figure 10:
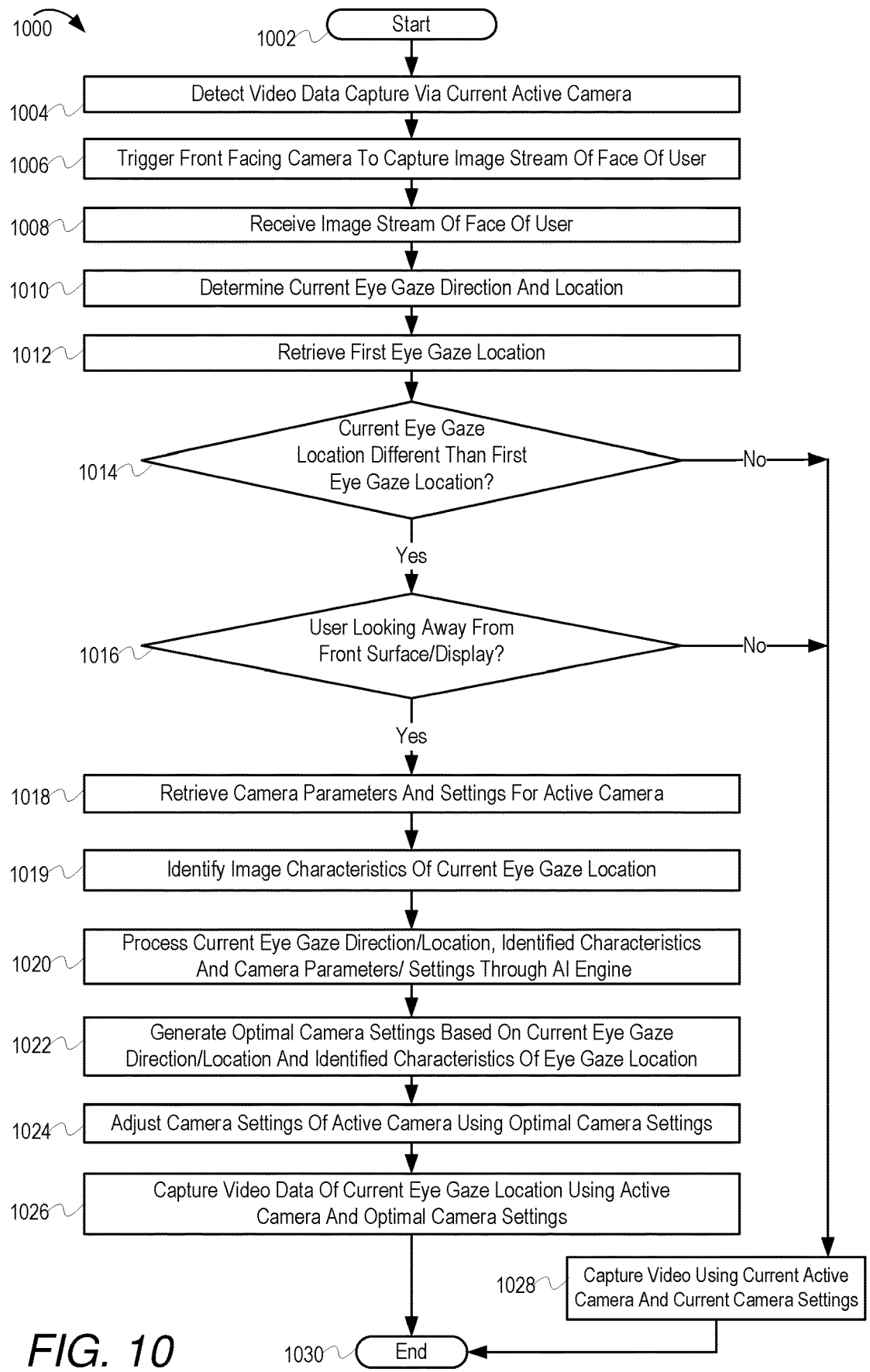
FIG. 10 depicts a flowchart of a method by which an electronic device tracks an eye gaze direction of a user and adjusts camera settings for use by the electronic device to capture video images, based on the eye gaze direction of a user, according to one or more embodiments.
Figure 11:
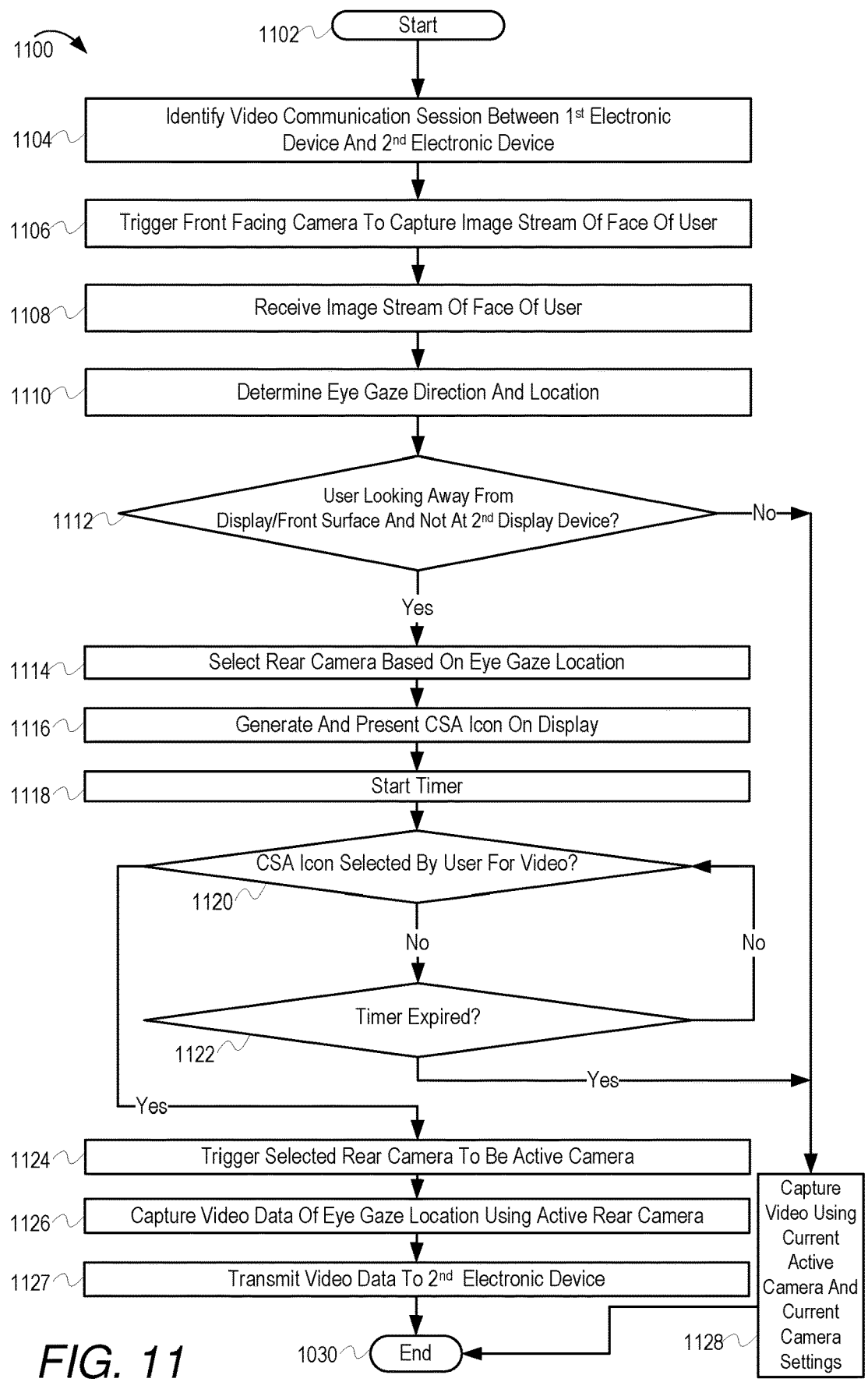
FIG. 11 depicts a flowchart of a method by which an electronic device that is in a video communication session with a second electronic device selects a rear facing camera to be the active camera for use by the electronic device during the video communication session, based on the eye gaze direction of the user, according to one or more embodiments.
Figure 12:
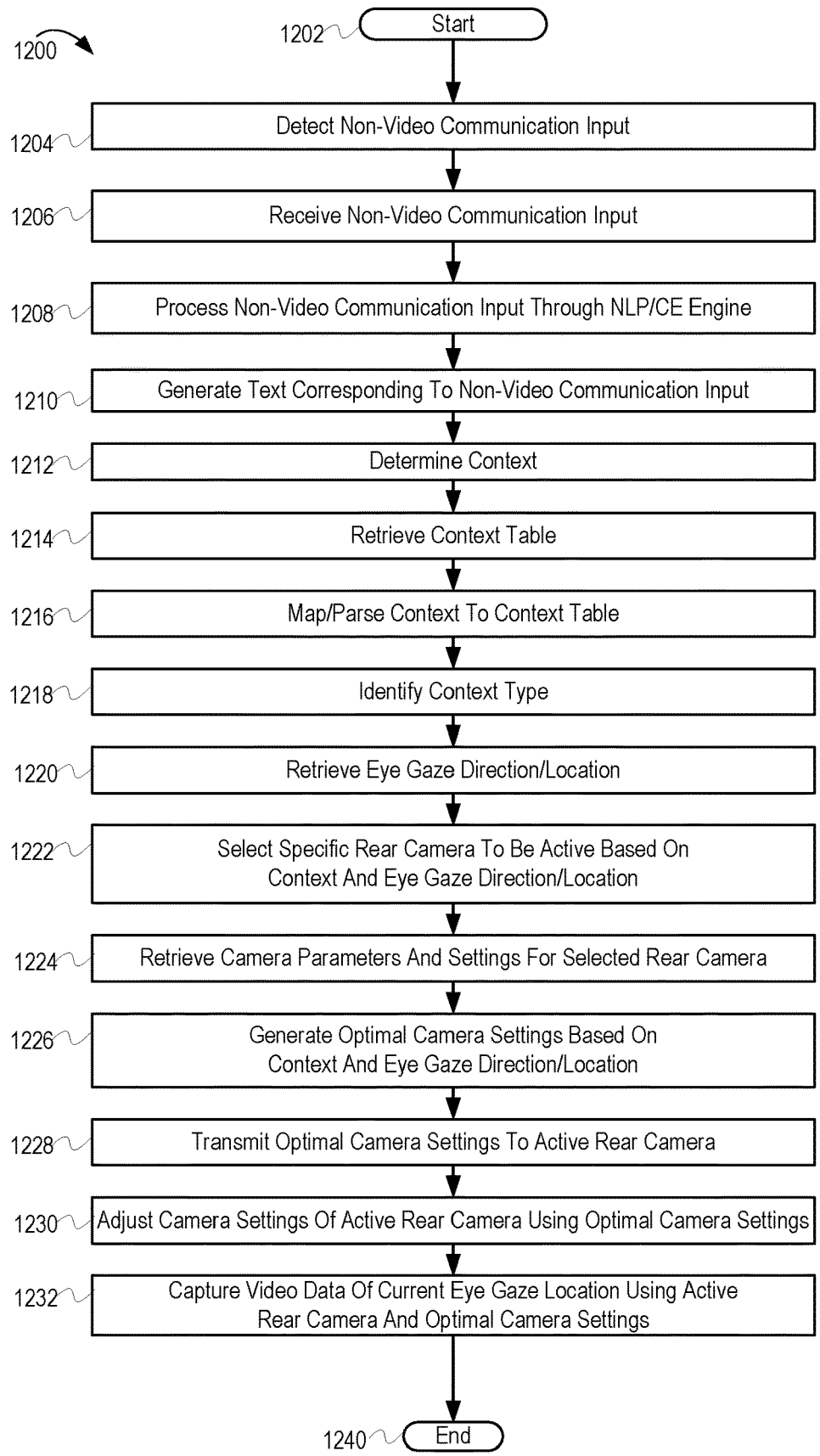
FIG. 12 depicts a flowchart of a method by which an electronic device selects a rear facing camera to be the active camera used in capturing video images, based on eye gaze direction and on the context of an audio communication input, according to one or more embodiments.

FIGS. 9A-9B depict method 900 by which electronic device 100 determines an eye gaze direction corresponding to a location where a user is looking and selects an active camera from at least one rear facing camera for use by the electronic device. FIG. 10 depicts method 1000 by which electronic device 100 tracks an eye gaze direction and generates optimal camera settings. FIG. 11 depicts method 1100 by which electronic device 100 generates and presents a camera selection/activation icon. FIG. 12 depicts method 1200 by which electronic device 100 generates camera settings at least partially based on context data derived from audio communication input. The description of methods 900, 1000, 1100, and 1200 will be described with reference to the components and examples of FIGS. 1-8B.

The operations depicted in FIGS. 9 (9A-9B), 10, 11, and 12 can be performed by electronic device 100 or any suitable electronic device that includes front and rear cameras and the one or more functional components of electronic device 100 that provide/enable the described features. One or more of the processes of the methods described in FIGS. 9, 10, 11, and 12 may be performed by processor 102 executing program code associated with CSCM 136, NLP/CE engine 212, and AI engine 214.

With specific reference to FIG. 9A, method 900 begins at the start block 902. At block 904, processor 102 detects that video data 270 is being captured by the current active camera (i.e., one of front facing cameras 132A-132B or rear facing cameras 133A-133C). Processor 102 triggers front facing camera 132A to capture an image stream 240 including second image 244 containing a face 614 of user 610 (block 906). Processor 102 receives image stream 240 including second image 244 (block 908). Processor 102 determines second eye gaze direction 260B and corresponding second location 262B based on second image 244 retrieved from the image stream 240 (block 910). Processor 102 stores second eye gaze direction 260B and second location 262B to system memory 120 (block 911). The second eye gaze direction 260B corresponds to second location 262B where the user is looking. The second location 262B is determined at least partially based on second eye gaze direction 260B.

Processor 102 retrieves eye gaze threshold time 218 and starts timer 216 (block 912). Timer 216 tracks the amount of time that a user's eye gaze has rested/remained on a specific area that is away from the display 130 at front surface 176 of electronic device 100. Processor 102 determines if user 610 is looking away from the display 130 at front surface 176 of electronic device 100 and towards a direction within a FOV of the rear facing cameras (decision block 914). In response to determining that user 610 is not looking away from the display 130, processor 102 captures video data 270 using the current active camera (block 928). Method 900 then ends at end block 930. In response to determining that user 610 is looking away from the front surface 176 and towards a direction behind the rear surface 180 of electronic device 100, processor 102 determines if the value of timer 216 is greater than eye gaze threshold time 218 (decision block 916). Eye gaze threshold time 218 is a minimum amount of time that a user is looking away from front surface 176 and display 130 to trigger a switch of active cameras to one of the rear facing cameras. In response to determining that the value of timer 216 is not greater than eye gaze threshold time 218, processor 102 returns to decision block 914 to continue determining if user 610 is looking away from the display 130.

In response to determining that the value of timer 216 is greater than eye gaze threshold time 218, processor 102 selects to activate as an active camera, a corresponding one of the rear facing cameras 133A-133C based on second location 262B and identified characteristics of the second location 262B (block 918). The selected rear facing camera has a FOV 646 towards second eye gaze direction 260B and containing second location 262B to which the user 610 is looking. If electronic device 100 has only one rear facing camera (i.e., rear facing camera 133A), processor 102 selects the single rear facing camera. Processor 102 retrieves camera parameters 264 and camera settings 266 for the selected rear facing camera (block 920).

Processor 102 generates optimal camera settings 268 for the selected rear facing camera based on the camera parameters 264, the second location 262B, and identified characteristics of the second location 262B (block 922). If electronic device 100 only has one rear camera, the camera settings are generated for the one rear camera. The optimal camera settings 268 allow the current location of interest (i.e., second location 262B) to be optimally captured within FOV 646 of the selected rear camera. The optimal camera settings 268 can include zoom levels, focus distance and directional settings that allow images that are desired to be captured with a camera FOV to be in focus, centered and correctly sized. Processor 102 activates the selected active camera and captures video data 270 using the selected active camera as a current active camera (i.e., one of rear facing cameras 133A-133C) (block 924).

With reference to FIG. 9B, processor 102 presents the captured video/images (i.e., video/image 652) containing objects or scene at second location 262B on GUI 650 presented on display 130 (block 940). Processor 102 generates the option of a user-selectable CSA icon 654 and presents CSA icon 654 on display 130 (block 942). In one or more embodiments, processor 102 may optionally generate CS icon 656 and present CS icon 656 on display 130 to enable the user to cancel the switch of the image capture device triggered by a temporary or inadvertent shift in the user's gaze. Processor 102 starts timer 219 (block 943).

Processor 102 determines if user 610 has provided user input by selecting CSA icon 654 using an input device such as touch screen interface 131 (decision block 944). In one embodiment, timer 219 can be set for 5 seconds. In response to determining that user 610 has not selected CSA icon 654, processor 102 checks if timer 219 has expired (decision block 946). In response to determining that timer 219 has expired, processor 102 deactivates the current active camera and resumes capturing video data using the previous active camera from before the user's eye gaze shifted away from the FOV of that camera (block 954). Method 900 then terminates at end block 956. In response to determining that timer 219 has not expired, processor 102 continues to check if CSA icon 654 has been selected by the user at block 954.

With the optional embodiments in which CS icon 656 is also presented, method 900 also includes processor 102 determining if user 610 has selected CS icon 656 using an input device such as touch screen interface 131. Then, in response to determining that user 610 has selected CS icon 654, processor 102 deactivates the current active camera and resumes capturing video stream using the previous active camera from before the user's eye gaze shifted away from the FOV of that camera.

In response to determining that user 610 has selected CSA icon 654, processor 102 transmits the optimal camera settings 268 to rear facing camera 133A (block 948) and triggers the rear facing camera 133A to be active (block 950). Processor 102 captures video data 270 (i.e., captured video content) of second location 262B using active rear facing camera 133A operating with optimal camera settings 268 (block 952). Optimal camera settings 268 can include zoom levels, focus distance and directional settings that allow images that are desired to be captured with a camera FOV to be in focus, centered and correctly sized. Method 900 then terminates at end block 956.

Referring to FIG. 10, there is presented method 1000 by which electronic device 100 tracks an eye gaze direction of a user and adjusts camera settings based on the eye gaze direction. Method 1000 begins at the start block 1002. In an embodiment, method 1000 can be repeated over a period of time to track the eye gaze direction of a user. At block 1004, processor 102, processor 102 detects that video data 270 is being captured by the current active camera (i.e., one of rear facing cameras 133A-133C). Processor 102 triggers front facing camera 132A to capture (monitor) an image stream 240 including second image 244 containing a face 614 of user 610 (block 1006). Processor 102 receives image stream 240 including second image 244 (block 1008). Processor 102 determines (analyzes) the current eye gaze direction (i.e., second eye gaze direction 260B) and the current location (i.e., second location 262B) based on second image 244 retrieved from the image stream 240 (block 1010). The second eye gaze direction 260B corresponds to second location 262B where the user is looking. In one embodiment, processor 102 tracks the eye gaze direction of the user by periodically monitoring image stream 240 (block 1006) and analyzing image 244 corresponding to image stream 240 to identify the current eye gaze direction (block 1008).

Processor 102 retrieves first location 262A from system memory 120 (block 1012). Processor 102 determines if the current location (i.e., second location 262B) is different than the first location 262A (decision block 1014). In response to the current location not being different than the first location 262A, processor 102 continues to capture video data 270 using the current active camera and camera settings (block 1028). Method 1000 then terminates at end block 1030.

In response to the current location being different than the first location 262A, processor 102 determines if user 610 is looking away from display 130 and the front surface 176 of electronic device 100 towards a new location that is within a FOV of one of the rear cameras (decision block 1016). In response to determining that user 610 is not looking away from display 130, processor 102 captures video data 270 using the current active camera and camera settings (block 1028). Method 1000 then ends at end block 1030.

In response to determining that user 610 is looking away from display 130 towards a new location to the rear of the electronic device, processor 102 retrieves camera parameters 264 and camera settings 266 for the current active rear facing camera (block 1018). In one embodiment, for example, the active rear facing camera of electronic device 100 can be rear facing camera 133A. Processor 102 identifies image characteristics 272 of the current location (i.e., second location 262B) that is visible within a FOV of at least one of the rear facing cameras 133A-133C) (block 1019). Processor 102 processes the current eye gaze direction (i.e., second eye gaze direction 260B), determined current location (i.e., second location 262B), camera parameters 264, image characteristics 272, and camera settings 266 through AI engine 214 (block 1020). Processor 102 generates optimal camera settings 268 for the active camera using AI engine 214 (block 1022). The optimal camera settings 268 for the active camera are generated based on the camera parameters 264, the current eye gaze direction, and corresponding current location, and on any identified/detected image characteristics 272 of the current location. The optimal camera settings 268 allow the current location (i.e., second location 262B) to be optimally captured within FOV 646 of the active rear camera.

In one embodiment for example, identified/detected image characteristics 272 can include the detection of a face with a FOV at eye gaze location 262. The detection of a face can be used by processor 102 to at least partially adjust one or more camera settings 266 to focus the camera on the detected face at the eye gaze location. For example, adjusting camera settings to focus the camera on the detected face at the eye gaze location can include adjusting a zoom level towards the detected face and adjusting light levels measured at the detected face to optimize the capturing of images of the detected face.

In another example embodiment, the eye gaze area would encompass a smaller area of the overall FOV of the rear facing active camera (e.g., rear facing camera 133A). The image characteristics 272 used for focusing can be employed within the smaller FOV. Methodologies used can include contrast-based autofocus, phase detection autofocus, computer vision (CV) techniques, machine learning (ML) and artificial intelligence (AI) based techniques to determine the subject of interest within the smaller FOV. The FOV can subsequently be adjusted based on this determination. For example, a user may be looking at a painting in a museum. The initial target FOV may be smaller than needed to capture the entire painting within the FOV. Using one or more of the focus methodologies, the target FOV can be adjusted to a larger FOV to fully capture the painting in the museum.

Processor 102 adjusts the camera settings of the active camera (i.e., rear-facing camera 133A) using the optimal camera settings (block 1024). Processor 102 captures video data 270 using the active camera (i.e., rear-facing camera 133A) operating with optimal camera settings 268 (block 1026). Optimal camera settings 268 can include zoom levels, focus distance and directional settings that allow images that are desired to be captured with a camera FOV to be in focus, centered and correctly sized. As previously introduced, optimal camera settings 268 can further include digital crop levels, focal distance of the focus module and directional audio zoom. The directional audio zoom enables microphone 108 to be tuned to receive audio primarily in the direction of a cropped FOV in a desired ROI. Optimal camera settings 268 further include modified electronic image stabilization (EIS) that enables stabilization to be optimized for subjects in a cropped FOV and exposure compensation that enables the cropped FOV to not be under or over exposed in a camera preview (viewfinder). Method 1000 then ends at end block 1030.

FIG. 11 shows method 1100 by which electronic device 100 enables user to determine whether to switch to a selected rear facing camera based on eye gaze direction for use by the electronic device during a video communication session. Method 1100 begins at the start block 1102. At block 1104, processor 102 identifies that a video communication session 386 is occurring between electronic 100 and electronic device 300. Processor 102 triggers front facing camera 132A to capture an image stream 240 including second image 244 containing a face 614 of user 610 (block 1106). Processor 102 receives image stream 240 including second image 244 (block 1108). Processor 102 determines the current eye gaze direction (i.e., second eye gaze direction 260B) and the current eye gaze direction (i.e., second location 262B) based on second image 244 retrieved from the image stream 240 (block 1110).

Processor 102 determines if user 610 is looking away from display 130 and the front surface 176 of electronic device 100 and not at second display device 648 and is looking towards a new location that is within a FOV of one of the rear cameras (decision block 1112). In response to determining that user 610 is not looking away from display 130 and the front surface 176 of electronic device 100 and is not looking at second display device 648 (FIG. 6C), processor 102 captures video data 270 using the current active camera (block 1128). Method 1100 then ends at end block 1130. In response to determining that user 610 is looking away from the front surface 176 and display 130, processor 102 selects as an active camera, a corresponding one of the rear facing cameras 133A-133C with a FOV 646 containing second eye gaze direction 260B and second location 262B to which the user 610 is looking (block 1114). If electronic device 100 has only one rear facing camera (i.e., rear facing camera 133A), processor 102 selects the single rear facing camera.

Processor 102 generates and presents CSA icon 654 on GUI 650 presented on display 130 (block 1116). Processor 102 starts timer 219 (block 1118) and determines if user 610 has selected CSA icon 654 using an input device such as touch screen interface 131 (decision block 1120). In one embodiment, timer 219 can be set for 5 seconds. In response to determining that user 610 has not selected CSA icon 654, processor 102 checks if timer 219 has expired (decision block 1122). In response to determining that timer 219 has expired (decision block 1122), processor 102 captures video data 270 using the current active camera (block 1128). Method 900 then terminates at end block 1130.

In response to determining that user 610 has selected CSA icon 654, processor 102 triggers the selected rear facing camera to be active (block 1124) and captures video data 270 of the scene present at second location 262B to where the user is looking using the selected rear facing camera (block 1126). Processor 102 transmits the captured video data 270 containing the scene present at second location 262B to second electronic device 300 via wireless network 150 (block 1127). Method 1100 then ends at end block 1130.

Turning to FIG. 12, there is presented a method 1200 by which electronic device 100 generates camera settings at least partially based on context data derived from audio communication input. Method 1200 begins at the start block 1202. At block 1204, processor 102 detects non-video communication input 220 via an input device. In one embodiment, non-video communication input 220 can be audio communication input 222 that is detected via audio input device 108. Processor 102 receives non-video communication input 220 (block 1206) and processes non-video communication input 220 through NLP/CE engine 212 using one or more NLP/CE processes (block 1208). Processor 102 generates a text transcription corresponding to the non-video communication input 220 (block 1210). Processor 102 determines one or more contexts (e.g., first context 232) from the text transcription (block Processor 1212). For example, processor 102 can determine that the text transcription includes various keywords that are used to identify one or more contexts.

Processor 102 retrieves context table 252 from system memory 120 (block 1214). Context table 252 is used to map/parse the context (i.e., first context 232) to one or more entries within context table 252. Processor 102 maps/parses the determined context to the context table 252 (block 1216) and identifies any context types 520 associated with the determined context (block 1218). In one embodiment, processor 102 can store context identifiers 510 and context types 520 as context identifying data 254 to system memory 120.

Processor 102 retrieves the current eye gaze direction (i.e., eye gaze direction 260) and the current eye gaze location (i.e., location 262) from system memory 120 (block 1220). Processor 102 selects, based on the current eye gaze direction, the current location, and the identified context, a corresponding one of the rear facing cameras 133A-133C as an active camera (block 1222). For example, if the first direction eye gaze direction 260A is facing in the direction of rear surface 180 of electronic device 100 and first location 262A is 5 degrees left and 15 degrees down, with an audio communication input 222 of "clothing" or "dress", then one of the rear facing cameras 133A-133C with FOV of the "clothing" or "dress" at that location can be selected as the active camera.

Processor 102 retrieves camera parameters 264 and camera settings 266 for the current active camera (block 1224). Processor 102 processes the current eye gaze direction 260, current location 262, camera parameters 264 and camera settings 266 through AI engine 214 and generates optimal camera settings 268 for the selected active rear camera using AI engine 214 (block 1226). The optimal camera settings 268 for the active rear camera are generated based on the camera parameters 264, the current eye gaze direction and location, and on any identified characteristics of the eye gaze location. The optimal camera settings 268 allow the current eye gaze location to be optimally captured within a FOV.

Processor 102 transmits the optimal camera settings 268 to the selected active rear camera (block 1228). Processor 102 adjusts the camera settings of the active rear camera using the optimal camera settings (block 1230). Processor 102 captures video data 270 using the selected active rear camera operating with optimal camera settings 268 (block 1232). Method 1200 then ends at end block 1240.

In the above-described methods of FIGS. 9A-12, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
    a front surface and a rear surface;
    at least one front facing camera and at least one rear facing camera;
    a memory having stored thereon a camera selection and control module (CSCM) for controlling the at least one front facing camera and the at least one rear facing camera; and
    at least one processor communicatively coupled to each of the at least one front facing camera, each of the at least one rear facing camera, and to the memory, the at least one processor executing program code of the CSCM, which enables the electronic device to:
        capture, via the at least one front facing camera, a first image stream containing a face of a first user;
        determine a first eye gaze direction of the first user based on a first image retrieved from the first image stream, the first eye gaze direction corresponding to a first location where the first user is looking;
        receive non-video input via an input device;
        determine, from the non-video input, one or more contexts related to a focus of the first user;
        select a rear facing camera, at least partially based on the first eye gaze direction and the one or more contexts;

generate at least one camera setting of a selected rear facing camera at least partially based on the first location and the one or more contexts determined from the non-video input; and activate the selected rear facing camera as an active camera, with the at least one camera setting, to capture a field of view that includes the focus of the first user.

2. The electronic device of claim 1, wherein to activate the selected rear facing camera, the at least one processor adjusts a directional setting of the selected rear facing camera using the generated at least one camera setting such that the selected rear facing camera focuses on the first location.

3. The electronic device of claim 2, wherein the at least one processor adjusts the directional setting to focus the selected rear facing camera on an object within the first location that is identified by the non-video communication input.

4. The electronic device of claim 2, wherein to adjust the active camera using the generated camera settings the at least one processor adjusts a zoom level of the rear facing camera to magnify captured images of the current location.

5. The electronic device of claim 1, wherein the at least one rear camera comprises a plurality of rear cameras and to select the rear facing camera, the at least one processor selects the rear facing camera from among the plurality of rear facing cameras that optimally captures the first location within the field of view of the selected rear facing camera, and wherein the optimal camera settings allow a current eye gaze location to be optimally captured within the field of view.

6. The electronic device of claim 1, wherein to generate the at least one camera setting of the at least one rear facing camera based on a current eye gaze direction and the one or more contexts determined from the non-video input, the at least one processor is further enabled to:

process the current eye gaze direction through an artificial intelligence engine, which generates the at least one camera setting for the selected rear facing camera based at least partially on the current eye gaze direction; and adjust at least a directional setting of the selected rear facing camera to focus the FOV of the active camera on a current location determined from the current eye gaze detection.

7. The electronic device of claim 1, further comprising:

a communication interface communicatively coupled to the at least one processor and which enables the electronic device to communicatively connect to at least one second electronic device via at least one network; and a display communicatively coupled to the at least one processor; and wherein the at least one processor:

enables video communication from the electronic device to the at least one second electronic device in a video communication session;

transmits, via the communication interface to the video communication session, image content captured within the FOV of the selected active camera from among the at least one rear facing camera and the at least one front facing camera; and in response to determining that the first user is looking away from the front surface of the electronic device and is not looking at a secondary display device coupled to the electronic device:

automatically generates a first graphical user interface (GUI) presenting a user-selectable camera selection/activation (CSA) option for the first user to select to activate a rear facing camera to capture and present captured video content to the video communication session, the CSA option, when selected, causing the electronic device to activate the selected one of the at least one rear facing camera as the active camera;

presents the first GUI including the CSA option on the display; and in response to receiving a selection of the CSA option:

captures a video stream, via the selected active rear facing camera; and transmits the captured video content to the video communication session.

8. The electronic device of claim 1, wherein:

the non-video input is audio input captured by an audio input device; and the at least one processor processes the audio input via a natural language processor/context evaluation (NLP/CE) engine to determine the one or more context.

9. A method comprising:

capturing, via the at least one front facing camera, a first image stream containing a face of a first user;

determining a first eye gaze direction of the first user based on a first image retrieved from the first image stream, the first eye gaze direction corresponding to a first location where the first user is looking;

receiving non-video input via an input device;

determining, from the non-video input, one or more contexts related to a focus of the first user;

selecting a rear facing camera, at least partially based on the first eye gaze direction and the one or more contexts;

generating at least one camera setting of a selected rear facing camera at least partially based on the first location and the one or more contexts determined from the non-video input; and activating the selected rear facing camera as an active camera, with the at least one camera setting, to capture a field of view that includes the focus of the first user.

10. The method of claim 9, wherein activating the selected rear facing camera comprises adjusting a directional setting of the selected rear facing camera using the generated at least one camera setting such that the selected rear facing camera focuses on an object within the first location that is identified by the non-video communication input.

11. The method of claim 9, further comprising adjusting a zoom level of the rear facing camera to magnify captured images of the current location using the generated camera settings.

12. The method of claim 9, wherein the at least one rear camera comprises a plurality of rear cameras and selecting the rear facing camera comprises selecting the rear facing camera from among the plurality of rear facing cameras that optimally captures the first location within the field of view of the selected rear facing camera, wherein the optimal camera settings allow a current eye gaze location to be optimally captured within the field of view.

13. The method of claim 9, wherein generating the at least one camera setting of the at least one rear facing camera based on a current eye gaze direction and the one or more contexts determined from the non-video input comprises:

processing the current eye gaze direction through an artificial intelligence engine, which generates the at least one camera setting for the selected rear facing camera based at least partially on the current eye gaze direction; and adjusting at least a directional setting of the selected rear facing camera to focus the FOV of the active camera on a current location determined from the current eye gaze detection.

14. The method of claim 9, wherein to generate the at least one camera setting of the selected rear facing camera based on a current eye gaze direction and the one or more contexts determined from the non-video input, the method further comprises:

retrieving, from the memory, first camera parameters and first camera settings for the selected rear facing camera; and generating at least one second camera setting of the selected rear facing camera at least partially based on the first eye gaze direction, the identified image characteristics of the first location, the first camera parameters and the first camera settings.

15. The method of claim 9, wherein:

the non-video input is audio input captured by an audio input device; and the at least one processor processes the audio input via a natural language processor/context evaluation (NLP/CE) engine to determine the one or more context.

16. A computer program product comprising:

a non-transitory computer readable storage device having stored thereon program code which, when executed by at least one processor of an electronic device having a front surface, a rear surface, at least one front facing camera, at least one rear facing camera, and a memory, enables the electronic device to complete functionality of capturing, via the at least one front facing camera, a first image stream containing a face of a first user;

determining a first eye gaze direction of the first user based on a first image retrieved from the first image stream, the first eye gaze direction corresponding to a first location where the first user is looking;

receiving non-video input via an input device;

determining, from the non-video input, one or more contexts related to a focus of the first user;

selecting a rear facing camera, at least partially based on the first eye gaze direction and the one or more contexts;

generating at least one camera setting of a selected rear facing camera at least partially based on the first location and the one or more contexts determined from the non-video input; and activating the selected rear facing camera as an active camera, with the at least one camera setting, to capture a field of view that includes the focus of the first user.

17. The computer program product of claim 16, wherein the program code for activating the selected rear facing camera comprises code for adjusting a directional setting of the selected rear facing camera using the generated at least one camera setting such that the selected rear facing camera focuses on an object within the first location that is identified by the non-video communication input.

18. The computer program product of claim 16, wherein to generate the at least one camera setting of the at least one rear facing camera based on a current eye gaze direction and the one or more contexts determined from the non-video input, the program code for generating and adjusting camera settings comprises program code that further enables the electronic device to complete the functionality of:

processing the current eye gaze direction through an artificial intelligence engine, which generates the at least one camera setting for the selected rear facing camera based at least partially on the current eye gaze direction; and adjusting at least a directional setting of the selected rear facing camera to focus the FOV of the active camera on a current location determined from the current eye gaze detection.

19. The computer program product of claim 16, wherein to generate the at least one camera setting of the at least one rear facing camera based on a current eye gaze direction and the one or more contexts determined from the non-video input, the program code for generating and adjusting camera settings comprises program code that further enables the electronic device to complete the functionality of:

retrieving, from the memory, first camera parameters and first camera settings for the selected rear facing camera; and generating at least one second camera setting of the selected rear facing camera at least partially based on the first eye gaze direction, the identified image characteristics of the first location, the first camera parameters, and the first camera settings.

20. The computer program product of claim 16, wherein:

the non-video input is audio input captured by an audio input device; and the program code comprises code that further enables the electronic device to process the audio input via a natural language processor/context evaluation (NLP/CE) engine to determine the one or more context.

* * * * *